US008429885B2

(12) United States Patent
Rosa et al.

(10) Patent No.: US 8,429,885 B2
(45) Date of Patent: Apr. 30, 2013

(54) CORDLESS MOWER INCLUDING COOLING AIR FLOW ARRANGEMENT

(75) Inventors: Richard P. Rosa, Kingston (CA); David M. Shaver, Brockville (CA); Patrick Marcil, Ottawa (CA); Joshua D. Eaton, Athens (CA); Mark Slobodian, Ottawa (CA); James D. Marshall, Gananoque (CA); Michael A. Milligan, Gananoque (CA); Patrick Wade Mooney, Brockville (CA)

(73) Assignee: Black & Decker Inc., Newark, DE (US)

( * ) Notice: Subject to any disclaimer, the term of this patent is extended or adjusted under 35 U.S.C. 154(b) by 140 days.

(21) Appl. No.: 12/975,499

(22) Filed: Dec. 22, 2010

(65) Prior Publication Data
US 2011/0088362 A1   Apr. 21, 2011

Related U.S. Application Data

(63) Continuation-in-part of application No. 12/838,898, filed on Jul. 19, 2010, which is a continuation-in-part of application No. 29/361,418, filed on May 11, 2010, now Pat. No. Des. 642,119, which is a continuation-in-part of application No. 12/426,499, filed on Apr. 20, 2009, now abandoned.

(60) Provisional application No. 61/048,002, filed on Apr. 25, 2008.

(51) Int. Cl.
*A01D 69/00* (2006.01)
(52) U.S. Cl.
USPC .............................................. 56/11.9; 56/12.8

(58) Field of Classification Search ................... 318/139, 318/599; 56/11.9, 12.8
See application file for complete search history.

(56) References Cited

U.S. PATENT DOCUMENTS 3,536,051 A * 10/1970 Hamman ................. 123/179.26
3,550,714 A    12/1970 Bellinger
(Continued)

FOREIGN PATENT DOCUMENTS

EP    1584224 A1    10/2005
EP    1698221 A1     9/2006
(Continued)

OTHER PUBLICATIONS

International Search Report and Written Opinion dated Mar. 8, 2012 for PCT International Application No. PCT/US2011/044336, 8 pages.

(Continued)

*Primary Examiner* — Árpád Fábián-Kovács
(74) *Attorney, Agent, or Firm* — Harness, Dickey & Pierce, P.L.C.

(57) ABSTRACT

A cordless mower includes a deck, a rechargeable battery, a blade for cutting grass, a blade motor and a drive motor. The deck is supported by front and rear wheels and has a top side, a bottom side, a front end and a rear end. The rechargeable battery is supported on the deck. The blade is on the bottom side of the deck and is coupled with a blade motor. The drive motor is connected to the rear wheels for driving said rear wheels to move the mower. The drive motor is located in a chamber at the rear of the mower adjacent the rear wheels. The chamber has an opening therein to allow air to flow through.

17 Claims, 28 Drawing Sheets

U.S. PATENT DOCUMENTS

| | | | |
|---|---|---|---|
| 3,593,505 A * | 7/1971 | Mittelstadt | 56/12.8 |
| 4,276,737 A * | 7/1981 | Henning | 56/12.8 |
| 4,753,062 A | 6/1988 | Roelle | |
| D300,132 S | 3/1989 | Culbertson et al. | |
| D301,228 S | 5/1989 | Culbertson et al. | |
| 4,847,513 A | 7/1989 | Katz et al. | |
| 4,944,142 A * | 7/1990 | Sueshige et al. | 56/320.1 |
| D320,379 S | 10/1991 | Culbertson | |
| D320,974 S | 10/1991 | Culbertson | |
| D321,680 S | 11/1991 | Blount et al. | |
| 5,085,043 A | 2/1992 | Hess et al. | |
| 5,163,273 A | 11/1992 | Wojtkowski et al. | |
| 5,490,370 A | 2/1996 | McNair et al. | |
| 5,606,851 A | 3/1997 | Bruener et al. | |
| 5,619,845 A * | 4/1997 | Bruener et al. | 320/137 |
| D387,329 S | 12/1997 | Jung et al. | |
| 5,819,513 A * | 10/1998 | Braun et al. | 56/11.9 |
| 5,937,622 A | 8/1999 | Carrier et al. | |
| 6,404,078 B1 | 6/2002 | Thomas et al. | |
| 6,658,829 B2 * | 12/2003 | Kobayashi et al. | 56/10.5 |
| 6,666,008 B2 * | 12/2003 | Iida et al. | 56/11.9 |
| D499,070 S | 11/2004 | Lavington | |
| 6,826,895 B2 | 12/2004 | Iida et al. | |
| 7,007,446 B2 * | 3/2006 | Dettmann | 56/11.9 |
| 7,434,642 B2 * | 10/2008 | Dettmann | 180/68.5 |
| 7,479,754 B2 * | 1/2009 | Lucas et al. | 318/599 |
| 7,540,132 B2 * | 6/2009 | Shimada et al. | 56/11.9 |
| D604,235 S | 11/2009 | Tarter | |
| D614,125 S | 4/2010 | Tinius | |
| 7,728,534 B2 * | 6/2010 | Lucas et al. | 318/139 |
| 7,762,049 B2 | 7/2010 | Eaton et al. | |
| 2003/0037525 A1 * | 2/2003 | Iida et al. | 56/11.9 |
| 2006/0059880 A1 | 3/2006 | Angott | |
| 2006/0090439 A1 * | 5/2006 | Anderson et al. | 56/10.2 G |
| 2008/0098703 A1 * | 5/2008 | Lucas et al. | 56/11.9 |
| 2009/0266042 A1 | 10/2009 | Mooney et al. | |
| 2010/0162674 A1 | 7/2010 | Eaton et al. | |
| 2010/0275564 A1 | 11/2010 | Baetica et al. | |

FOREIGN PATENT DOCUMENTS

| | | |
|---|---|---|
| EP | 2374346 A1 | 10/2011 |
| WO | WO-2008015479 A2 | 2/2008 |

OTHER PUBLICATIONS

European Search Report dated Jul. 16, 2009 for European Application No. 09158635.4, 6 pgs.

European Search Report dated Apr. 4, 2012 for European Application No. 11193653.0, 5 pgs.

* cited by examiner

CORDLESS MOWER INCLUDING COOLING AIR FLOW ARRANGEMENT

CROSS-REFERENCE TO RELATED APPLICATIONS

This application is a continuation-in-part of U.S. Ser. No. 12/838,898, filed Jul. 19, 2010, which is a continuation-in-part of U.S. Design application No. 29/361,418, filed on May 11, 2010 and a continuation-in-part of U.S. application Ser. No. 12/426,499, filed Apr. 20, 2009, which claims the benefit and priority of U.S. Provisional Application No. 61/048,002, filed Apr. 25, 2008. The entire disclosure of each of the above applications is incorporated herein by reference.

FIELD

The present disclosure relates to lawn mowers and more specifically to a cordless electric lawn mower.

BACKGROUND

Due to concerns regarding urban air pollution, the problems and maintenance needs of gas engines, as well as other factors, electric lawn mowers are gaining in popularity. Moreover, due to the inconveniences and operating limitations of corded electric mowers, battery operated cordless electric mowers may be preferred. As described herein however, such battery operated mowers can have drawbacks.

Some of these drawbacks can be associated with the functionality of the battery, including battery life and the storage and transfer of the battery, including insertion and removal of the battery from the mower.

Other drawbacks are associated with self-drive transmissions that use a belt-tensioning drive system, whereby the tension on a set of variable stepped sheaves can be configured to control the speed of a drive axle from a continuous speed motor. Such a system however is inefficient because the self-drive motor must run constantly at high speed, thereby constantly drawing maximum power. Furthermore, as is known in the art, efficiency losses are observed in such a slipping belt system.

According to other drawbacks associated with battery operated mowers, in some instances during high-load grass cutting (i.e., wet, and/or thick grass), the operating speed of the blade motor(s) is reduced while the speed of a self-drive motor is unchanged. In this way, cutting performance is degraded because the speed of the self-drive motor is not adjusted to compensate for the reduced operating speed of the blade motor.

Other drawbacks associated with battery operated mowers involve a cumbersome mulching mode switching process and inadequate driver feedback information. For example, it may be desirable for an operator to easily obtain information relating to battery-power, mower blade operation, self-drive motor operation and/or other information, such as operational faults associated with the mower.

SUMMARY

A cordless mower includes a deck, a rechargeable battery, a blade for cutting grass, a blade motor and a drive motor. The deck is supported by front and rear wheels and has a top side, a bottom side, a front end and a rear end. The rechargeable battery is supported on the deck. The blade is on the bottom side of the deck and is coupled with a blade motor. The drive motor is connected to the rear wheels for driving said rear wheels to move the mower and is located in a chamber at the rear of the mower adjacent the rear wheels. The chamber has an opening therein to allow air to flow through.

A cordless mower includes a deck, a rechargeable battery, a drive motor, a speed lever and a control circuit. The deck is supported by front and rear wheels and has a top side, a bottom side, a front end and a rear end. The rechargeable battery is supported on said deck. The drive motor is connected to the rear wheels for driving said rear wheels to move the mower. The speed lever is controlled by a user to set the speed of the mower. The control circuit is connected to the speed lever and controls the amount of current delivered from the battery to the drive motor. The control circuit monitors the drive motor and shuts off the drive motor when the current being delivered exceeds a predetermined current for a predetermined period of time.

A cordless mower includes a deck, a rechargeable battery, a drive motor, a blade motor and a handle. The deck is supported by front and rear wheels and has a top side, a bottom side, a front end and a rear end. The rechargeable battery is supported on said deck. The drive motor is connected to the rear wheels for driving said rear wheels to move the mower. The blade motor is coupled to a blade. The handle is secured to the rear end of said deck. The handle has a blade bail for controlling power to the blade motor and a drive bail for controlling power to said drive motor so that power to the blade motor and the drive motor are independently controlled.

A cordless mower includes a deck, a rechargeable battery, a blade for cutting grass and a mulch door. The deck is supported by front and rear wheels and has a top side, a bottom side, a front end and a rear end. The bottom side defines a cutting chamber and a discharge passage extending rearwardly from the cutting chamber to the rear of said mower. The rechargeable battery is supported on said deck. The blade is arranged within the cutting chamber. The mulch door is positioned in said discharge passage and is movable between an open and closed position. The mulch door rotates about a vertical shaft that is connected to a knob located at a top side of the deck.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
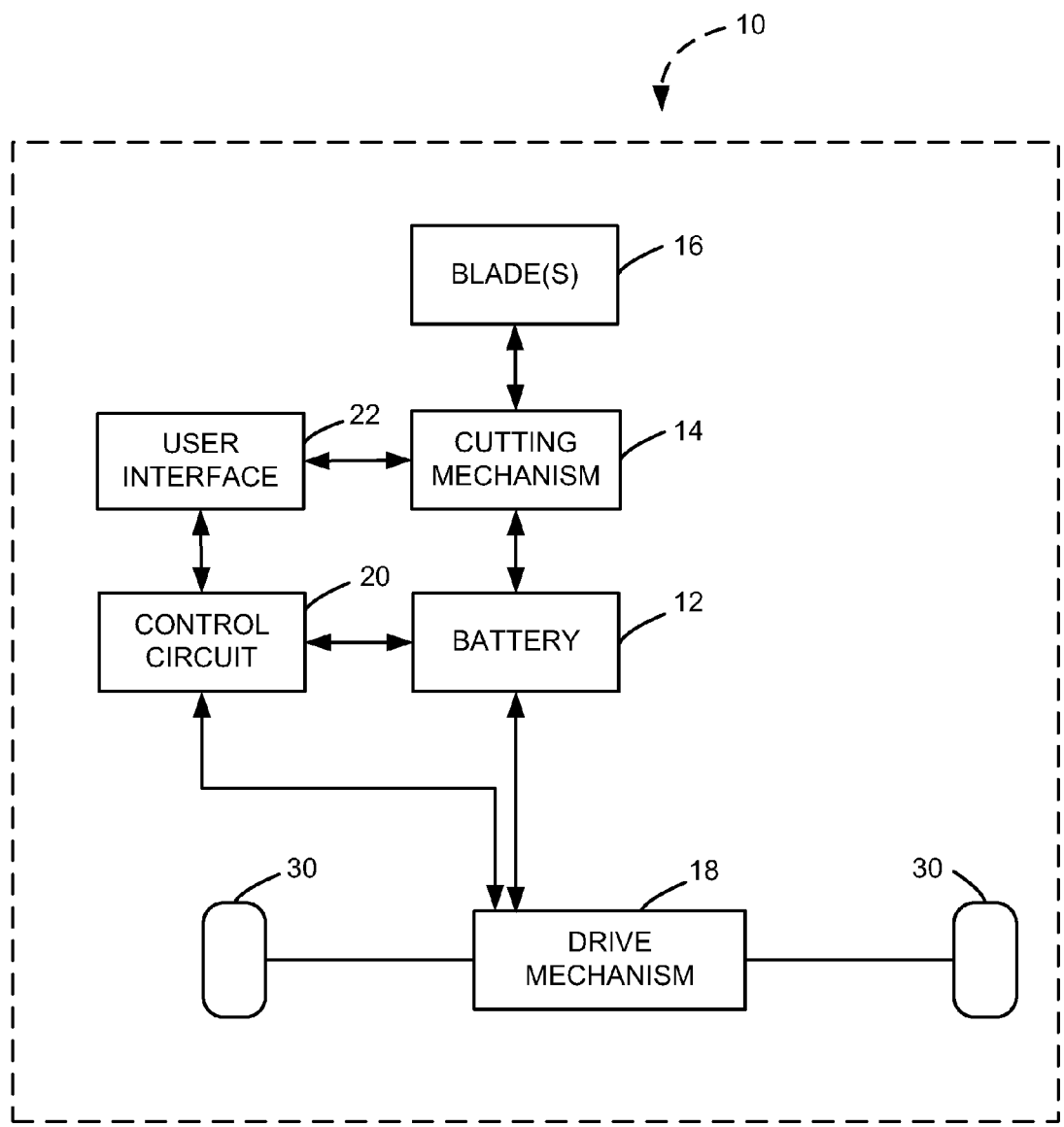
FIG. 1 is a schematic block diagram of an exemplary battery-powered mower constructed in accordance with the teachings of the present disclosure.

With initial reference to FIG. 1, an exemplary battery-powered lawn mower 10 (hereinafter, mower) is schematically illustrated. The mower 10 includes a battery 12, a cutting mechanism 14 for driving blade(s) 16, a drive mechanism 18 for driving wheels 30, a control circuit 20 and a user interface 22. The battery 12 supplies power to the cutting mechanism 14 and the drive mechanism 18, which in the exemplary embodiment shown is a blade motor 54 and a drive motor 56, respectively. The amount of power delivered to the drive mechanism 18 by the battery 12 is determined by the control circuit 20 which is managed by the user interface 22.

Figure 2:
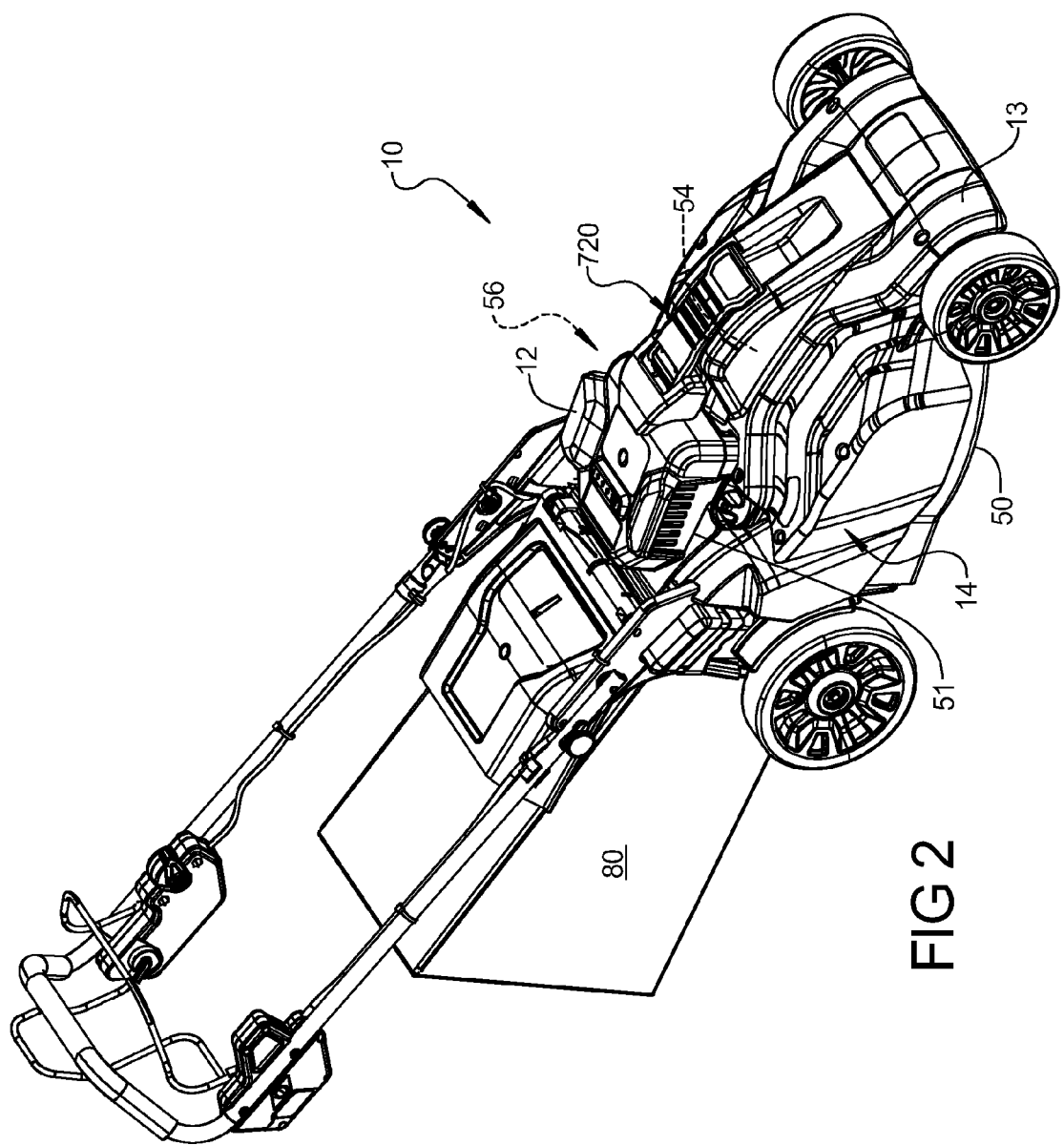
FIG. 2 is a perspective view of an exemplary battery-powered lawn mower constructed in accordance with the teachings of the present disclosure.
Figure 28:
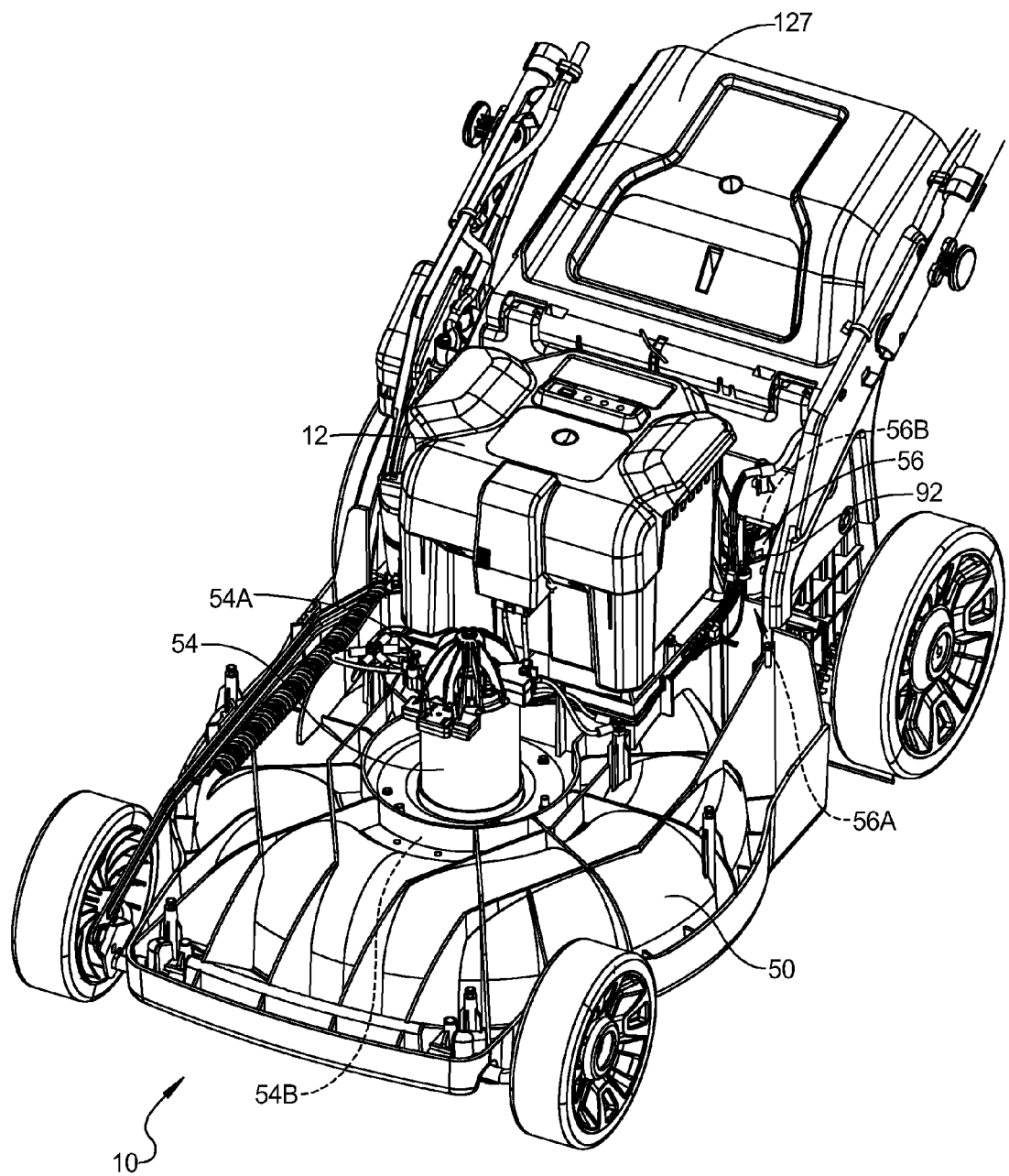
FIG. 28 is a partial perspective view of the exemplary battery-powered lawn mower shown in FIG. 2 with a portion of the deck removed.

With reference to FIGS. 2 and 28, the exemplary battery-powered lawn mower 10 will be described. The mower 10 includes a deck 50 that provides a mounting structure for various components of the mower 10, including the blade motor 54 and the drive motor 56, and generally forms the housing for the blade(s) 16 coupled to the blade motor 54. A shroud 13 is placed over the deck 50 to protect the internal components of the mower 10.

Figure 6:
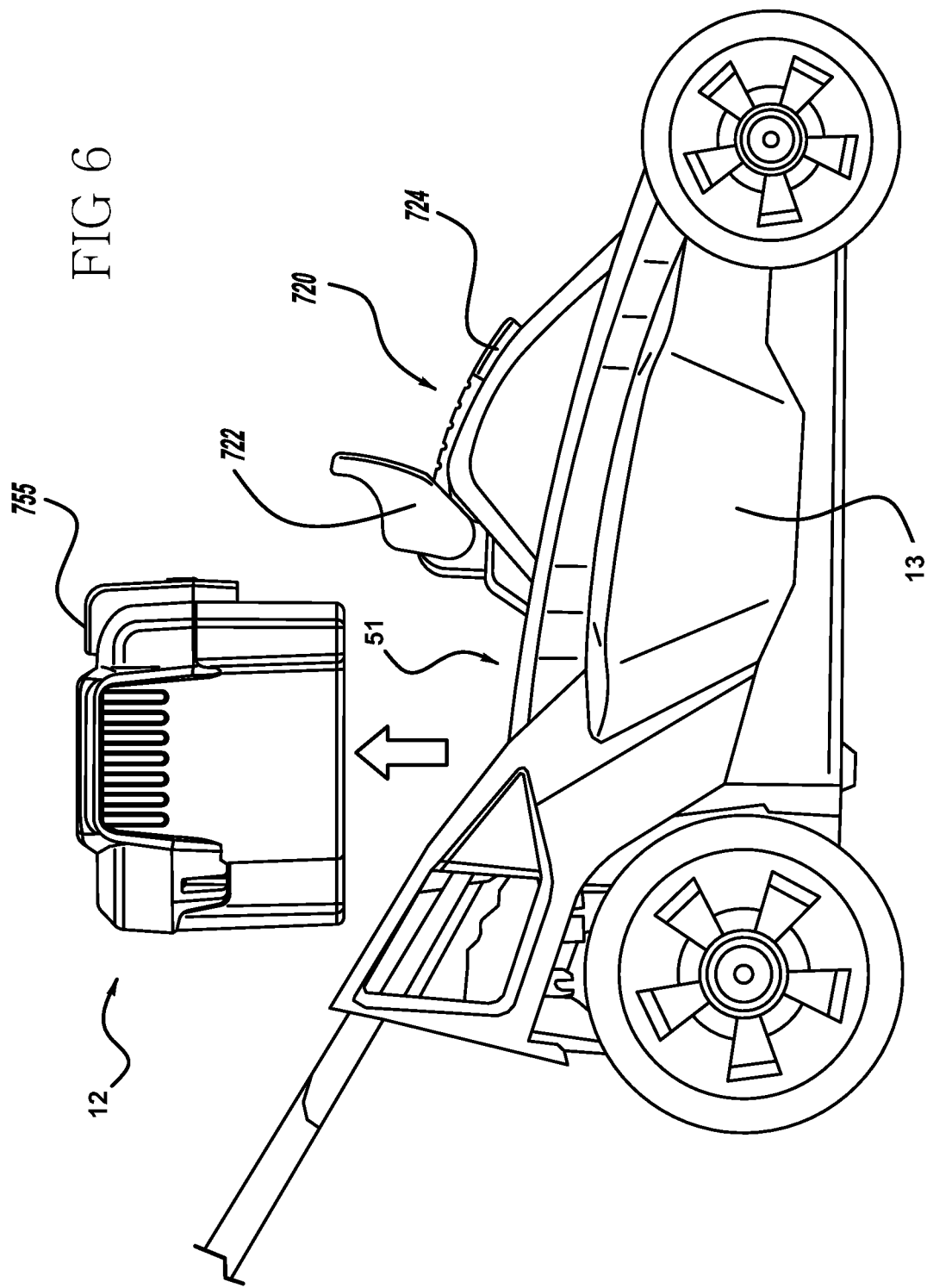
FIG. 6 is a perspective view of the exemplary battery-powered lawn mower shown in FIG. 2 with the battery being removed from the pocket.
Figure 7:
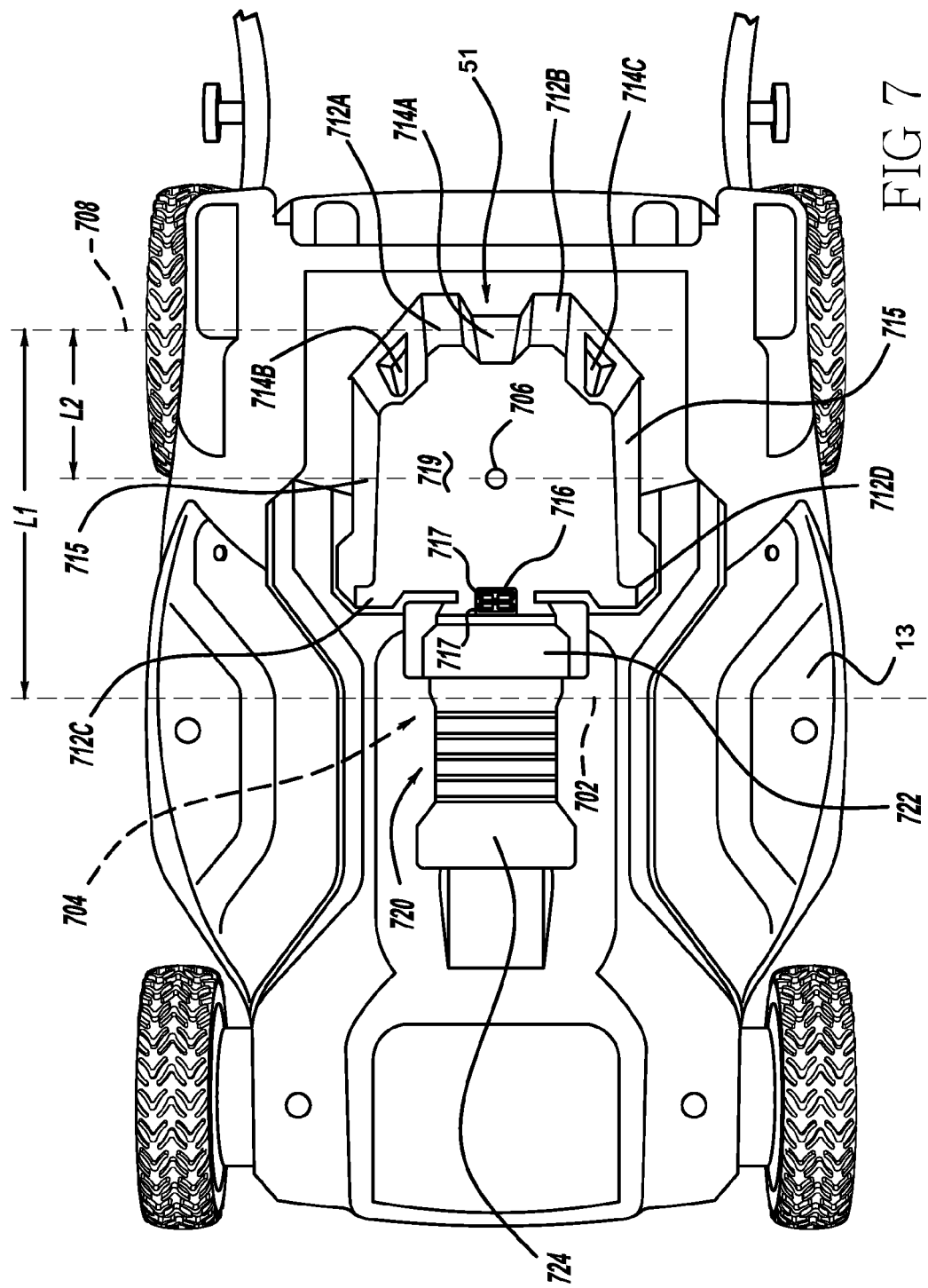
FIG. 7 is a partial plan view of the exemplary battery-powered lawn mower shown in FIG. 2 with the battery removed to illustrate the pocket.

With reference to FIGS. 6 and 7, the shroud 13 defines a pocket 51 that receives the battery 12. The battery 12 has a shape that corresponds to the shape of the pocket 51 such that the battery 12 fits snugly within the pocket 51.

Figure 9:
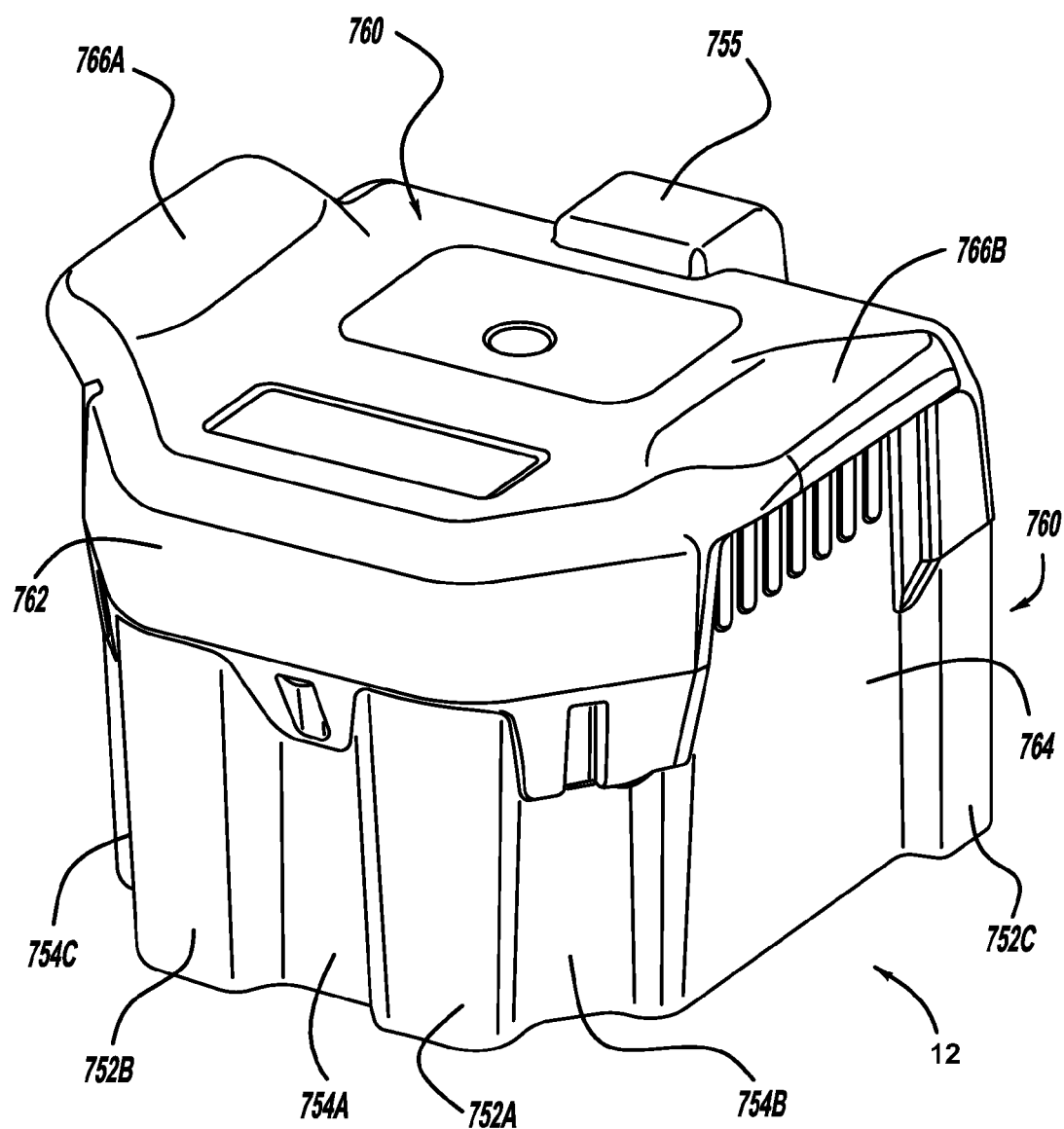
FIG. 9 is another perspective view of the battery of the exemplary battery-powered lawn mower shown in FIG. 2.

With additional reference to FIG. 7, the pocket 51 includes a base portion 719 with a plurality of walls 715 arranged substantially perpendicular to the base portion 719. The shape of the battery 12 complements the shape of the pocket 51 such that the battery 12 can be inserted within the pocket in a single orientation. Pocket 51 can define one or more recesses 712A-D (FIG. 7) that correspond to one or more projections 752A-D (FIGS. 9-10) on the battery 12 and one or more projections 714A-C that correspond to one or more recesses 754A-C defined by the battery 12. In this manner, the battery 12 can be inserted within the pocket 51 only when the projection(s) 752A-D, 714A-C and recess(es) 754A-C, 712A-D are properly aligned. Furthermore, the projection(s) 752A-D, 714A-C and recess(es) 754A-C, 712A-D can assist with guiding the battery 12 to the proper positioning within the pocket 51. Additionally, the walls 715 of pocket 51 can be tapered to assist in guiding the battery 12 to the proper positioning within the pocket 51.

The location of the battery 12 is such that the mower 10 is well-balanced and stable. The battery 12 (and pocket 51) is positioned rearward of the longitudinal center 702 of the deck 50 such that a user may more easily maneuver the mower 10. This position puts more weight towards the rear of the mower, which provides increased traction to the rear drive wheel(s) 30 and also aids in tilting or lifting the front wheels off the ground for better maneuverability. In addition, the battery 12 and pocket 51 may be positioned in the approximate center of the width of the deck 50 to increase stability and inhibit sideways tipping.

Figure 18:
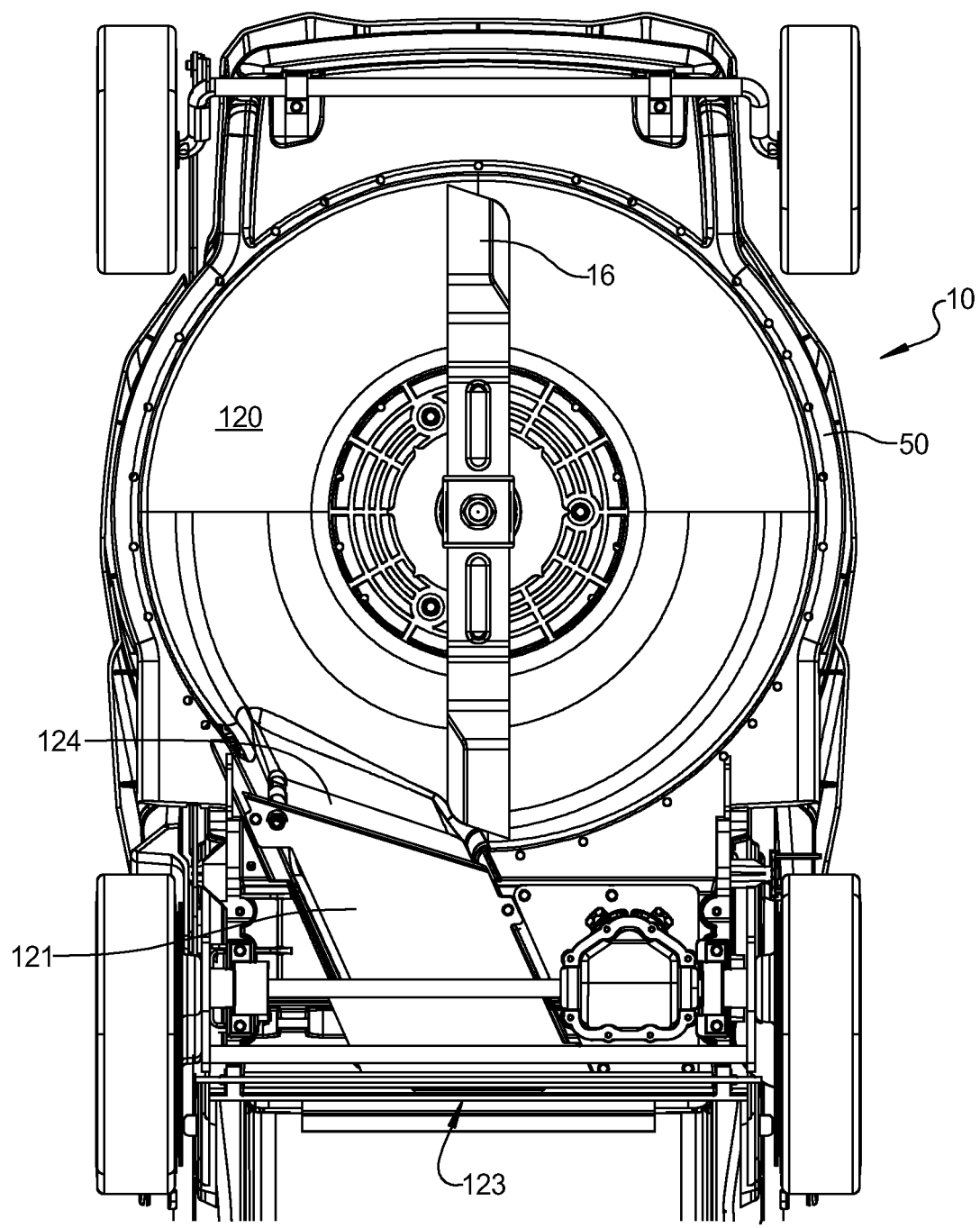
FIG. 18 is a partial plan view of the exemplary battery-powered lawn mower shown in FIG. 2 in a mulch configuration.
Figure 19:
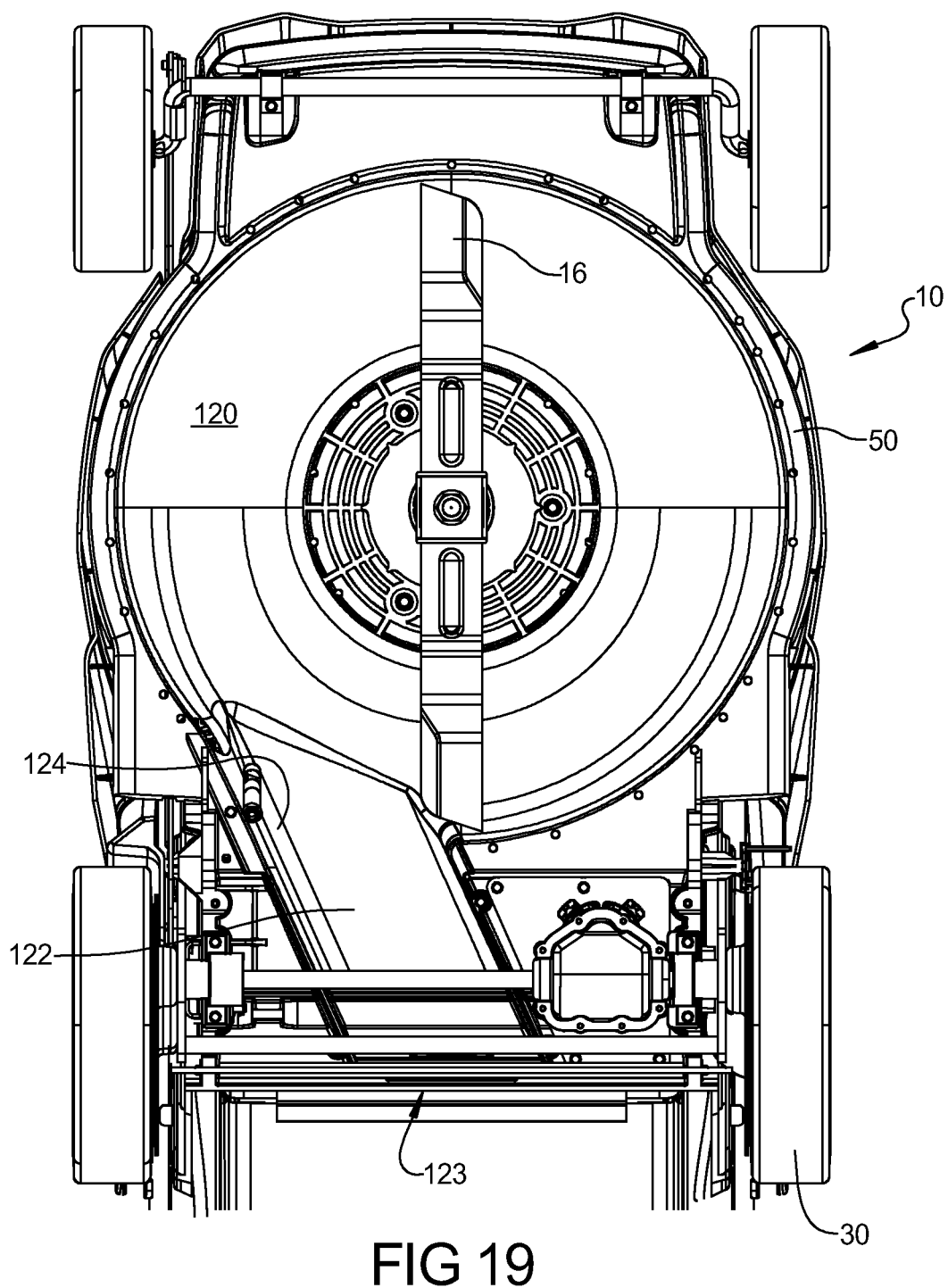
FIG. 19 is a partial plan views of the exemplary battery-powered lawn mower shown in FIG. 2 in a discharge configuration.

The blade motor 54 (and the axis of rotation of the blade 16) is arranged along the longitudinal center 702 of the deck 50 (FIGS. 18 and 19). The center 706 of the battery 12/pocket 51 can be positioned rearward of the longitudinal center 702 by at least fifty percent of the distance L1 between the longitudinal center 702 and the rear wheel axle axis 708. In other words, the distance L1 between the longitudinal center 702 and the rear wheel axle axis 708 is at least twice the distance L2 between the center 706 of the battery 12/pocket 51. For example only, the distance L1 can be 380 millimeters and the distance L2 can be 160 millimeters such that the distance L1 is 2.375 times the distance L2.

In order to further increase stability and inhibit tipping of the mower 10, the depth of the pocket 51 can be increased. Increasing the depth of the pocket 51 reduces the overall height of the mower 10 with the battery 12 installed. Further, the battery 12 can comprise a large portion of the overall weight of the mower 10. Thus, increasing the depth of the pocket 51 also lowers the center of gravity of the mower 10.

Figure 3:
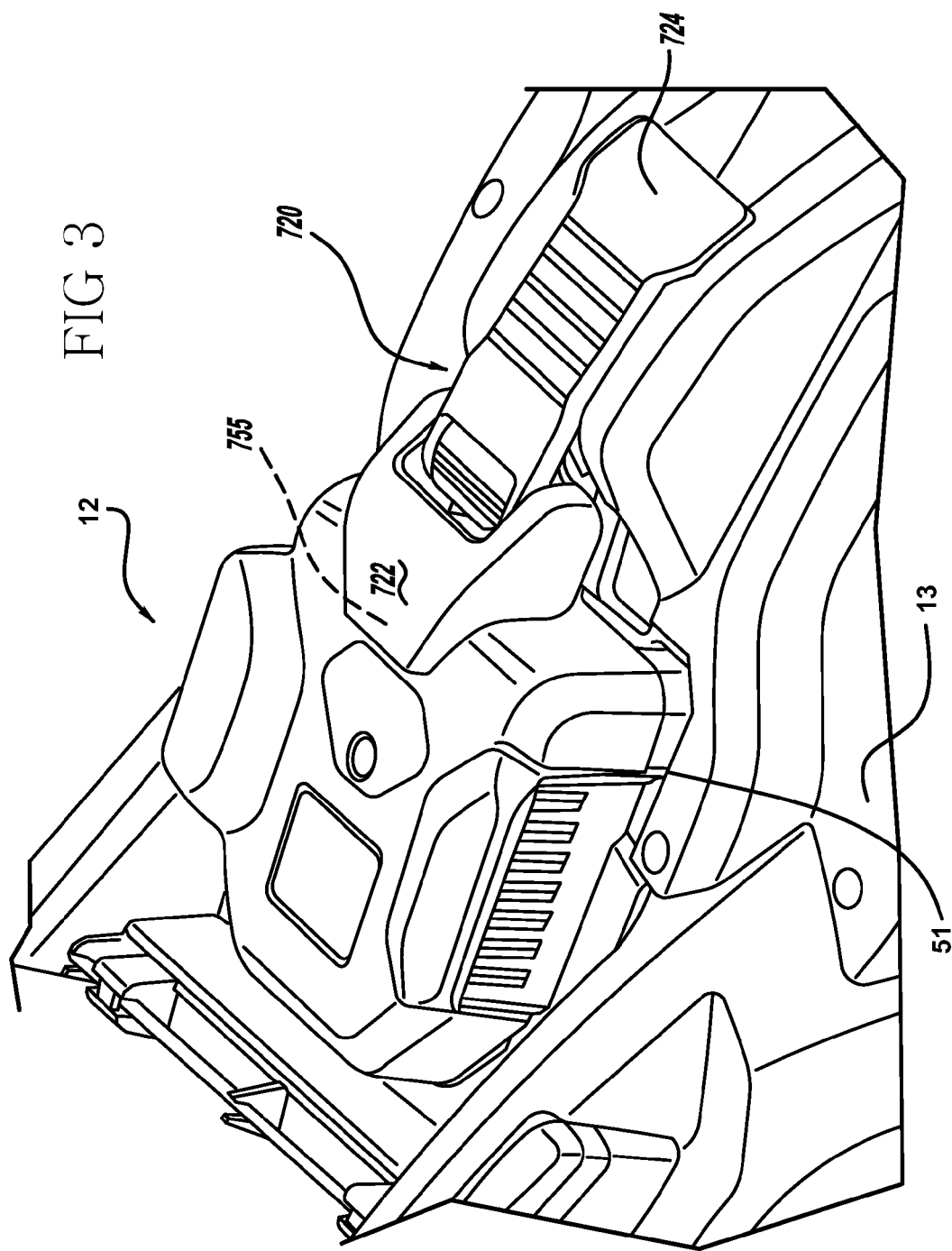
FIG. 3 is a partial perspective view of the exemplary battery-powered lawn mower shown in FIG. 2 in a first configuration.
Figure 4:
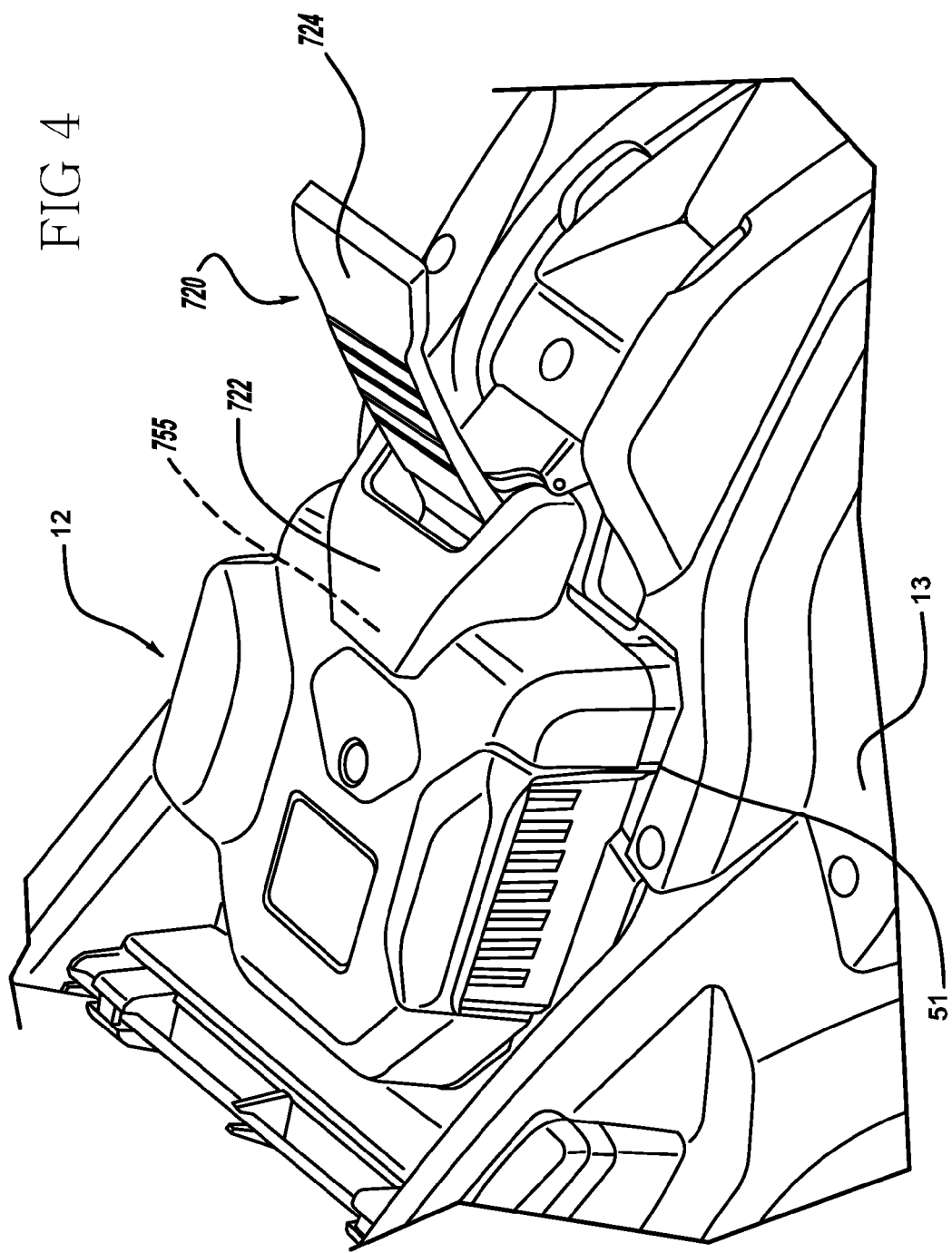
FIG. 4 is a partial perspective view of the exemplary battery-powered lawn mower shown in FIG. 2.
Figure 5:
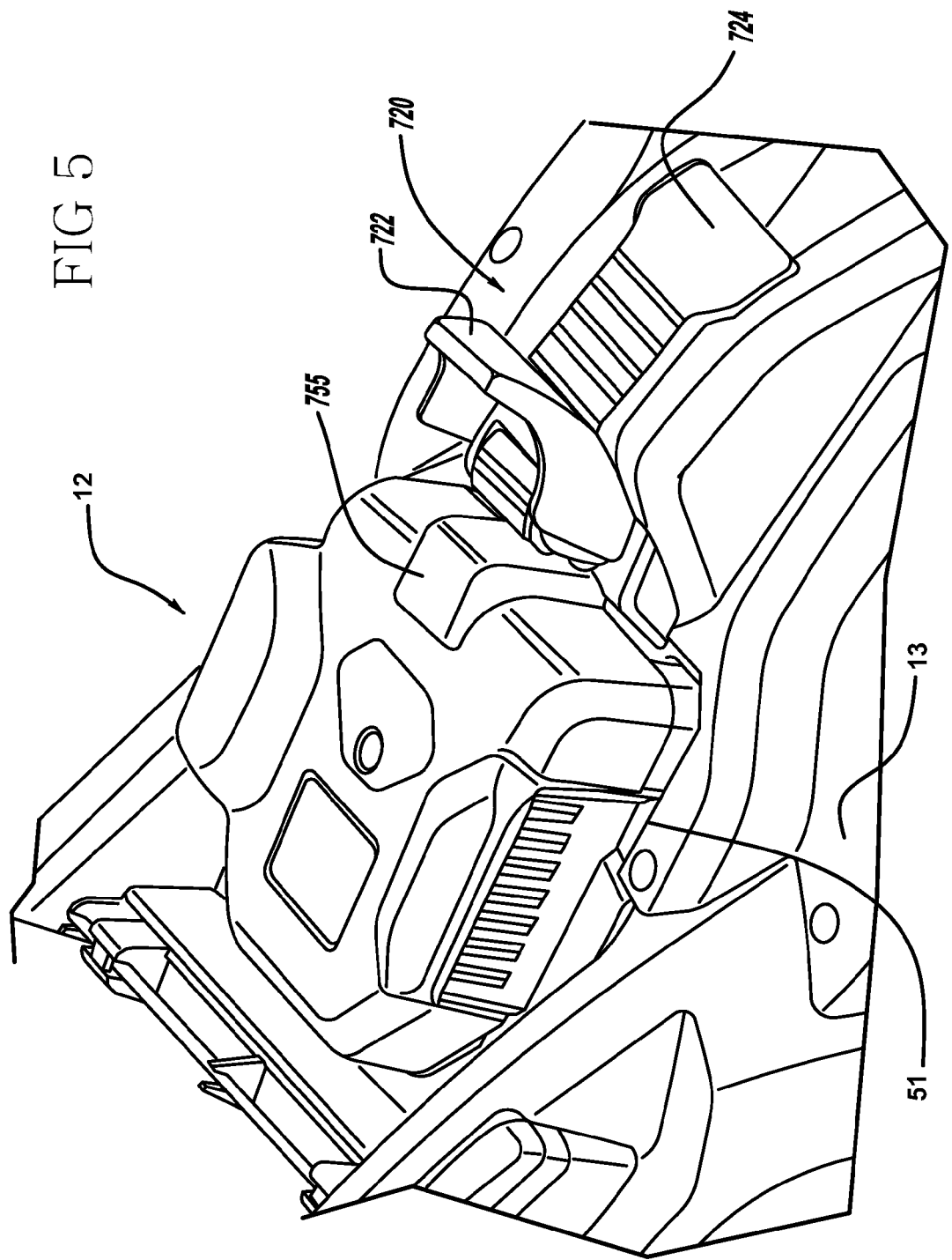
FIG. 5 is a partial perspective view of the exemplary battery-powered lawn mower shown in FIG. 2 in a second configuration.

With reference to FIGS. 3-6, a latch assembly 720 is coupled to the shroud 13. While latch assembly 720 is an over-center type latch, other latching configurations are may be substituted therefore, such as sliding latches or rotating latches. The latch assembly 720 includes a latch 722 and lever 724. The latch 722 engages a latch catch 755 formed on the battery 12 to secure the battery 12 within the pocket 51 in a first configuration, as shown in FIG. 3. The lever 724 is rotated, as shown in FIG. 4, to disengage the latch 724 from the latch catch 755. In a second configuration shown in FIG. 5, the latch 722 is fully opened and completely disengaged from the battery 12 such that the battery 12 can be freely removed from the pocket 51. As more fully described below, the battery 12 can be removed from the pocket 51 by moving the battery 12 in the direction of the arrow shown in FIG. 6.

The latching assembly 720 may further include a biasing member, e.g., a spring that biases the latching assembly 720 to be in the second configuration. Upon releasing the latch 722 from engagement with the latch catch 755, the biasing member may automatically move the latch 722 to the fully opened position shown in FIG. 5. In this manner, the latching assembly 720 may be easily moved from the first configuration (FIG. 3) to the second configuration (FIG. 5) by a user utilizing one hand. In order to secure the battery 12 within the pocket 51, a user manually engages the latch 722 with the latch catch 755 while rotating the lever 724. Then, the lever 724 is moved to the lock position while the latch 722 is engaged with the latch catch 755 (FIG. 3).

Figure 10:
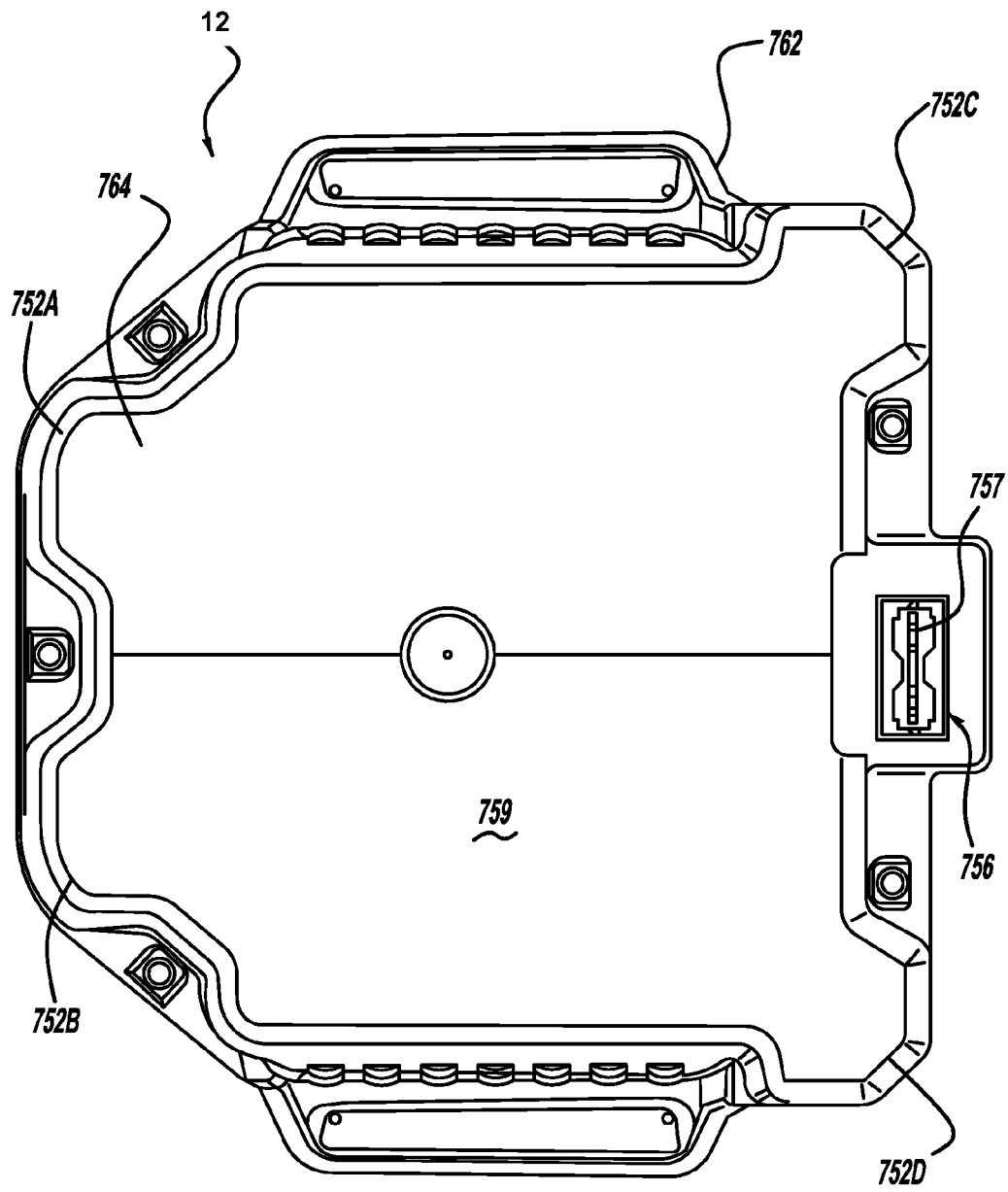
FIG. 10 is a bottom view of the battery of the exemplary battery-powered lawn mower shown in FIG. 2.
Figure 11:
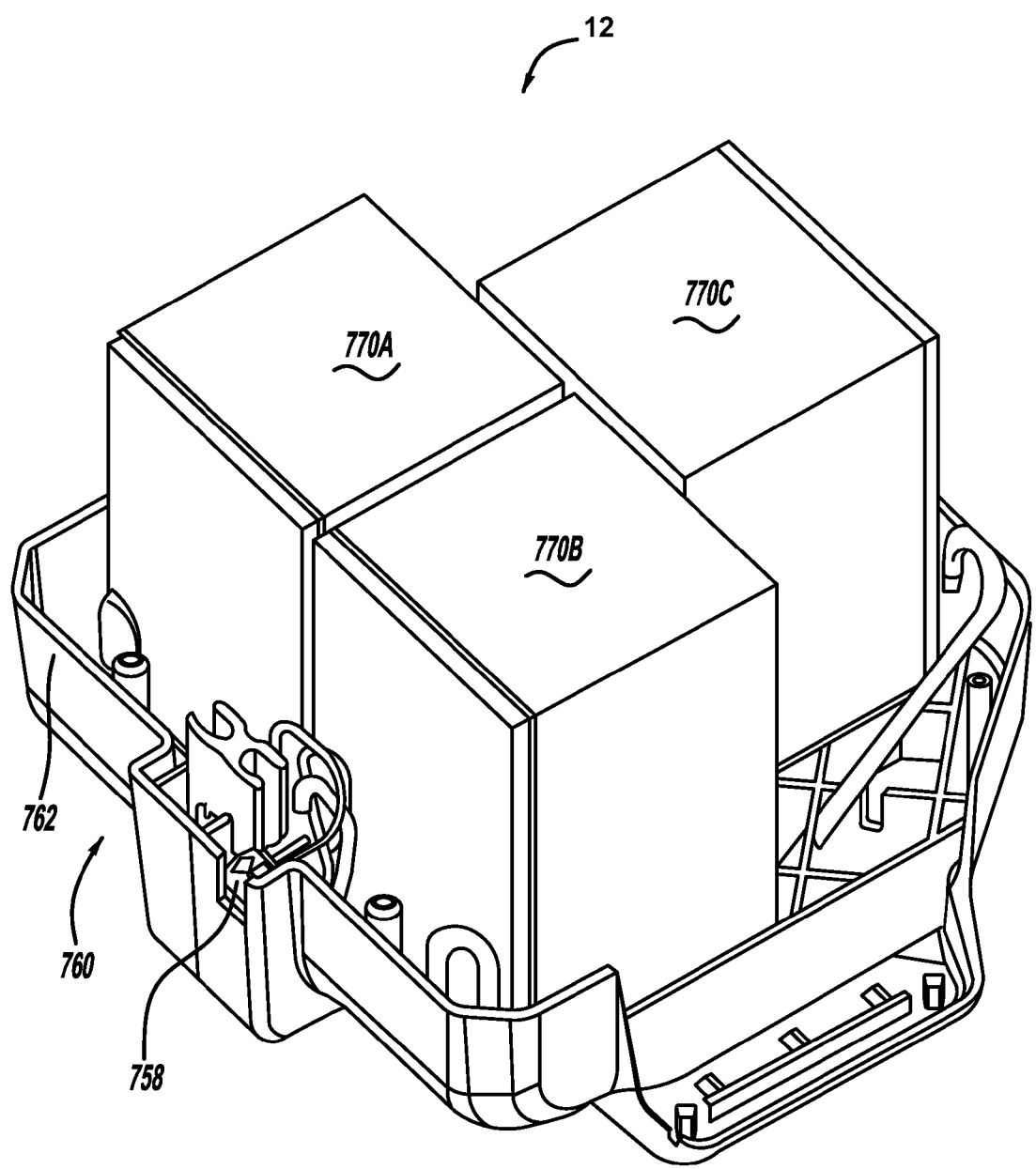
FIG. 11 is a partial perspective view of the battery of the exemplary battery-powered lawn mower shown in FIG. 2 with a portion of the battery housing removed to illustrate a series of cells housed therein.
Figure 15:
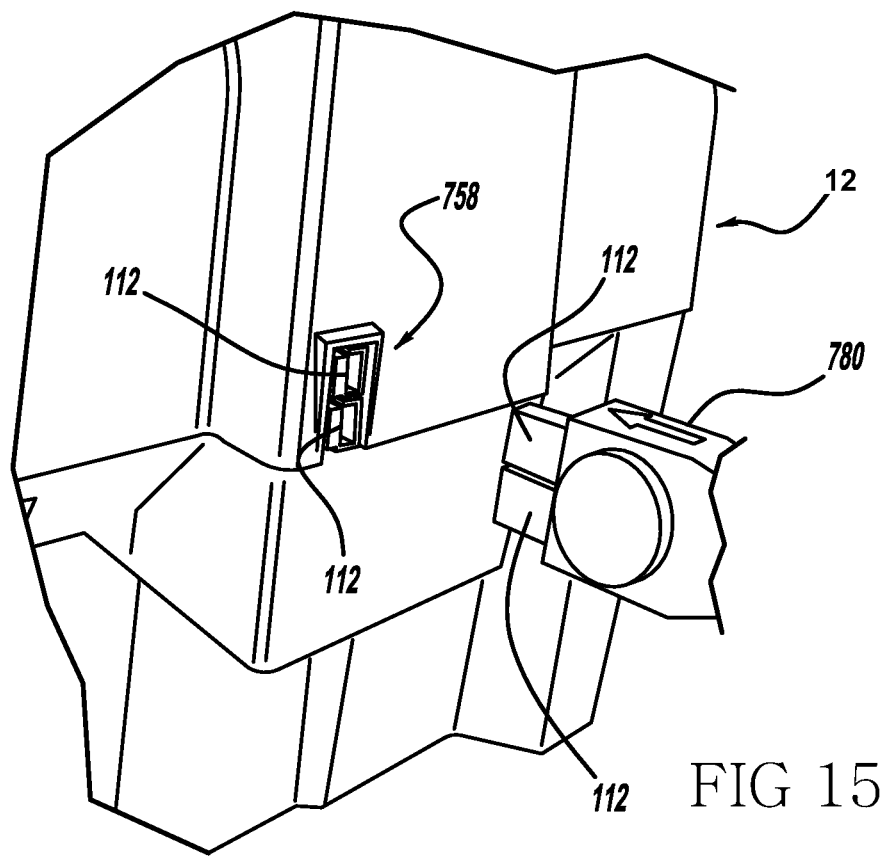
FIG. 15 is a partial perspective view of the battery of the exemplary battery-powered lawn mower shown in FIG. 2 with an exemplary charger cable.

With reference to FIGS. 2, 7 and 10, in order to electrically couple the battery 12 with the other components of the mower 10, a mower connector 716 is provided within the pocket 51. The mower connector 716 can include one or more projections 717 extending from the pocket 51. The one or more projections 717 are configured to mate with corresponding recess(es) 757 of a first battery connector 756 in a male-female connector configuration. The projection(s) 717 and recess(es) 757 may act as guide features that assist in positioning the battery 12 within the pocket 51. The mower connector 716 and/or the first battery connector 756 can be self-aligning to ensure a proper connection between the mower 10 and battery 12. In some embodiments, the latching assembly 720 is used to fully secure and couple the mower connector 716 with the first battery connector 756. The battery 12 may include a second battery connector 758 (FIGS. 8 and 15), e.g., for connection with a charger cable 780 (FIG. 15). The second battery connector 758 (FIG. 8) is located on a portion of the battery 12 that is inaccessible to a user when the battery 12 is in the first configuration, i.e., secured within pocket 51, such that the battery 12 cannot be charged through the second battery connector 758 when the mower 10 is operating. In this way, the first battery connector 756 is utilized to provide power to the mower 10 and also to charge the battery 12, while the second battery connector 758 is used only to charge the battery 12 (via charger cable 780). With reference to FIG. 15, the charger cable 780 can be constructed to engage with the second battery connector 758 in a single orientation. Any or all of the mower connector 716, first battery connector 756 and second battery connector 758 can be one or more Anderson-type electrical connectors to ensure proper electrical connections.

While the battery 12 is secured within the pocket 51, the charger cable 780 is connected to an electrical connector portion 732 associated with user interface 22, as is described more fully below. User interface 22 is electrically coupled to the mower connector 716 such that power may be provided to the battery 12 when coupled with mower connector 716.

Figure 12:
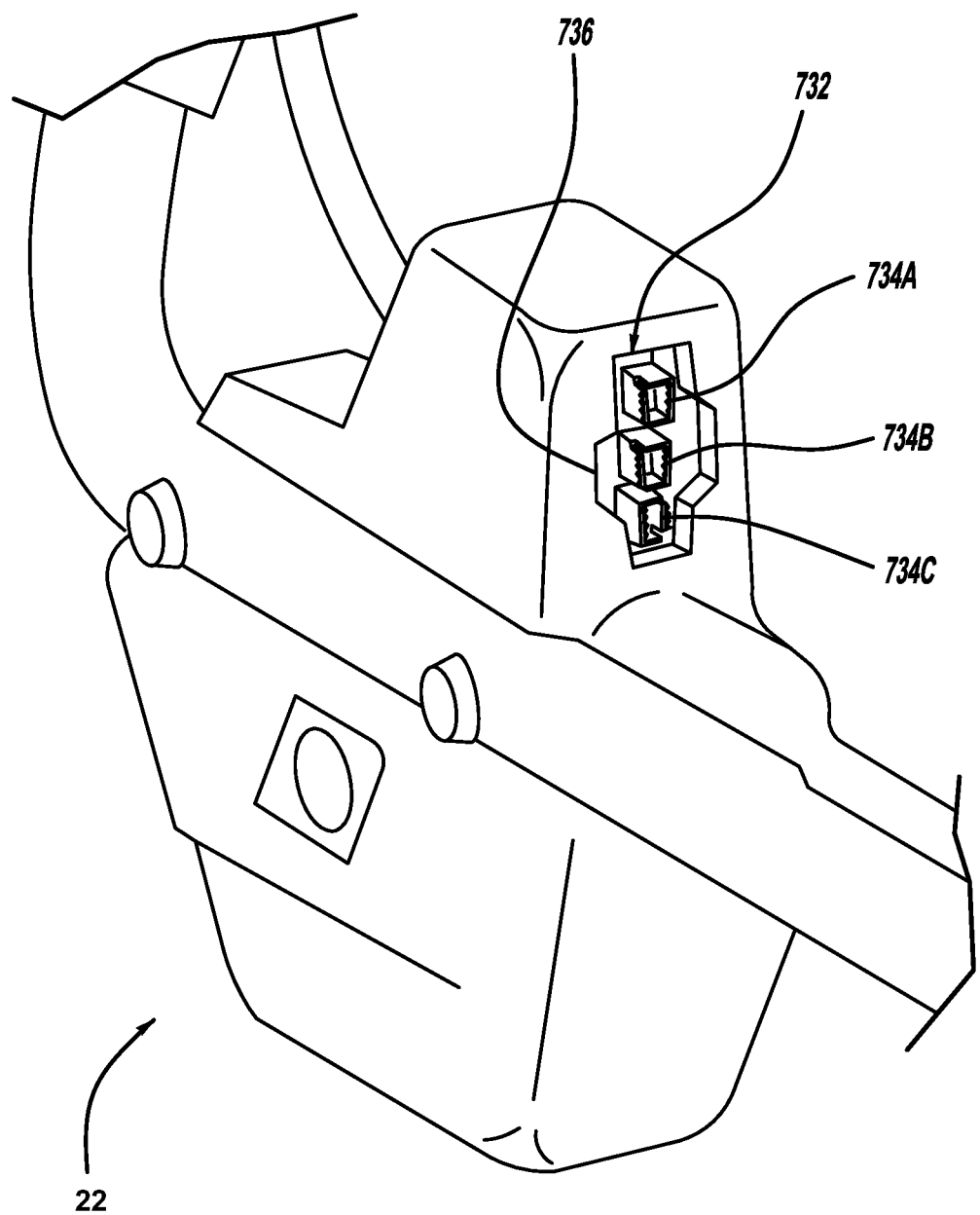
FIG. 12 is a partial perspective view of a control of the exemplary battery-powered lawn mower shown in FIG. 2.
Figure 16:
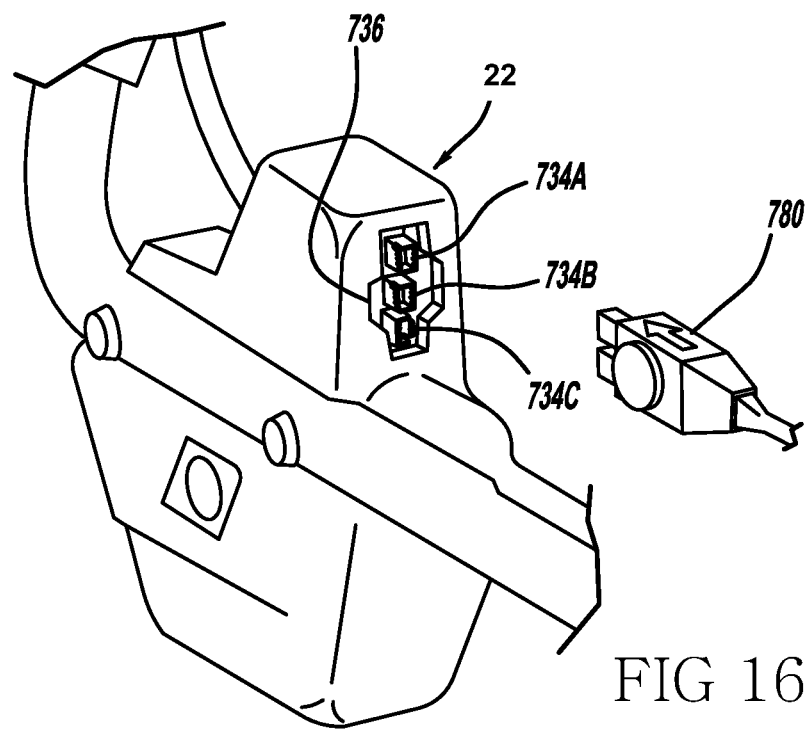
FIG. 16 is a partial perspective view of the exemplary control assembly shown in FIG. 12 with an exemplary charger cable.

A portion of an exemplary user interface 22 is shown in FIGS. 12 and 16. User interface 22 includes an electrical connector portion 732 that has three electrical connectors 734A-C. Electrical connectors 734A-C can be any type of electrical connector, such as Anderson-type electrical connectors. Electrical connectors 734A and 734B are utilized to connect with charger cable 780 to charge the mower 10. Electrical connectors 734A and 734C are utilized to connect with a safety key 740 (FIGS. 13-14), further described below.

In order to inhibit improper connections, the electrical connectors 734A-C can be arranged such that the charger cable 780 can be engaged with electrical connector portion 732 in a single orientation, i.e., connected with electrical connectors 734A and 734B.

Figure 13:
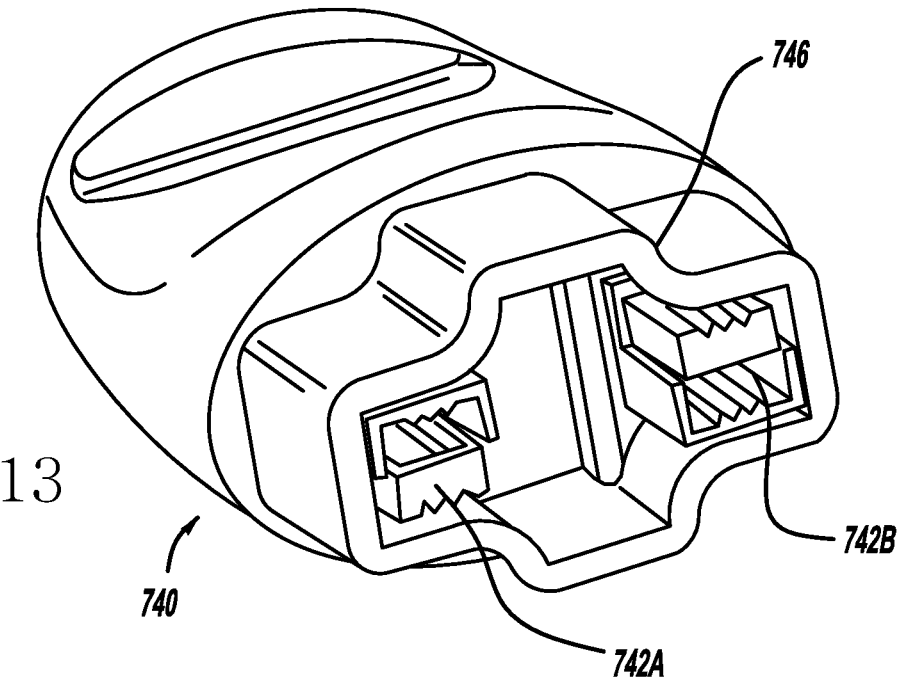
FIG. 13 is a perspective view of a safety key corresponding to the exemplary battery-powered lawn mower shown in FIG. 2.
Figure 14:
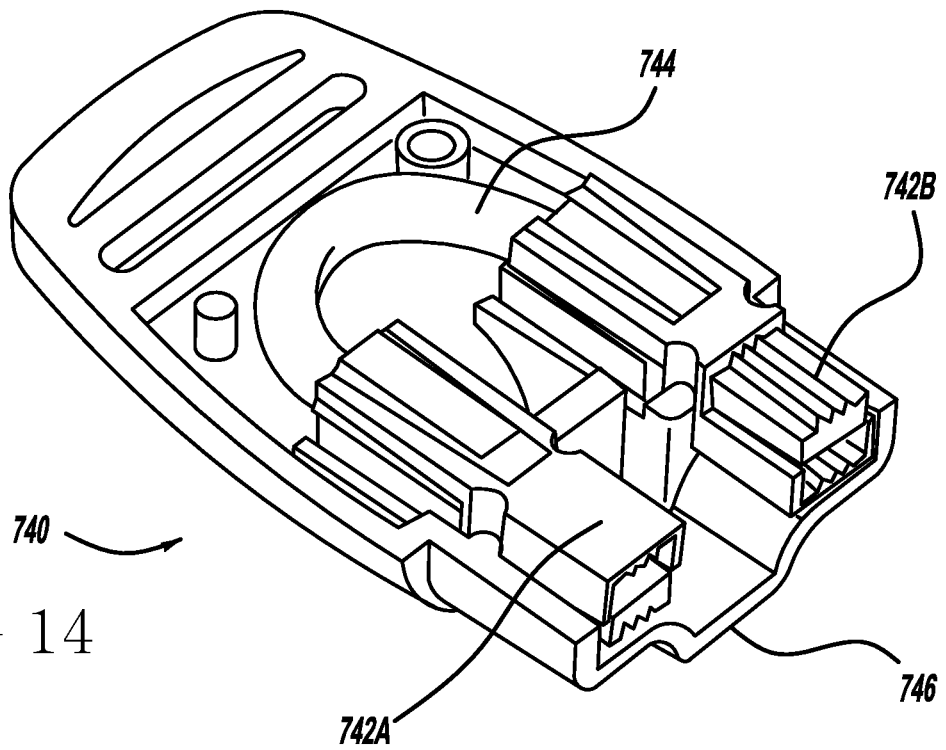
FIG. 14 is a partial sectional view of the safety key of FIG. 13.

In FIGS. 13 and 14, safety key 740 includes two electrical connectors 742A and 742B. Electrical connectors 742A and 742B are configured to mate with electrical connectors 734A and 734C of the user interface 22. For example only, electrical connectors 742A and 742B may be coupled by a jumper 744 to electrically couple electrical connectors 734A and 734C when the safety key 740 is mated with electrical connector portion 732. Safety key 740 includes a keyed portion 746 that has a shape that corresponds and complements the shaped of keyed portion 736 of user interface 22. The keyed portions 736, 746 and electrical connectors 742A, 742B, 734A and 734C may be constructed and arranged symmetrically such that the safety key 740 can properly mate with electrical connector portion 734 in either of two orientations, i.e., 742A with 734A and 742B with 734C or 742A with 734C and 742B with 734A. The safety key 740 operates to connect the battery 12 with the blade and drive motors 54, 56 when mated with the electrical connector portion 732. When the safety key is removed from the electrical connector portion 732, electrical connectors 734A and 734C are decoupled and power from the battery 12 cannot be delivered to either the blade and/or drive motors 54, 56.

An exemplary battery 12 will be described with particular reference to FIGS. 8-11. Battery 12 includes three cells 770A-C, which can be connected in series and arranged within a housing 760. However, it should be understood that the battery may include any number of cells and fall within the scope of the present disclosure. The housing 760 includes a first portion 762 mated with a second portion 764. The first battery connector 756 is arranged on the second portion 764 and the second battery connector 758 is arranged on the first portion 762.

The battery 12 further includes a first handle 766A and a second handle 766B. The first and second handles 766A-B may be utilized by a user to insert or remove the battery 12 from the pocket 51. In a non-limiting example, the first and second handles 766A-B are monolithically formed with the first portion 762 of the housing 760. The first handle 766A is arranged on a first side 767 of the housing 760 and the second handle 766B is arranged on a second side 769 of the housing 760 that is opposite the first side to encourage a user to use two hands when handling the battery 12.

Figure 8:
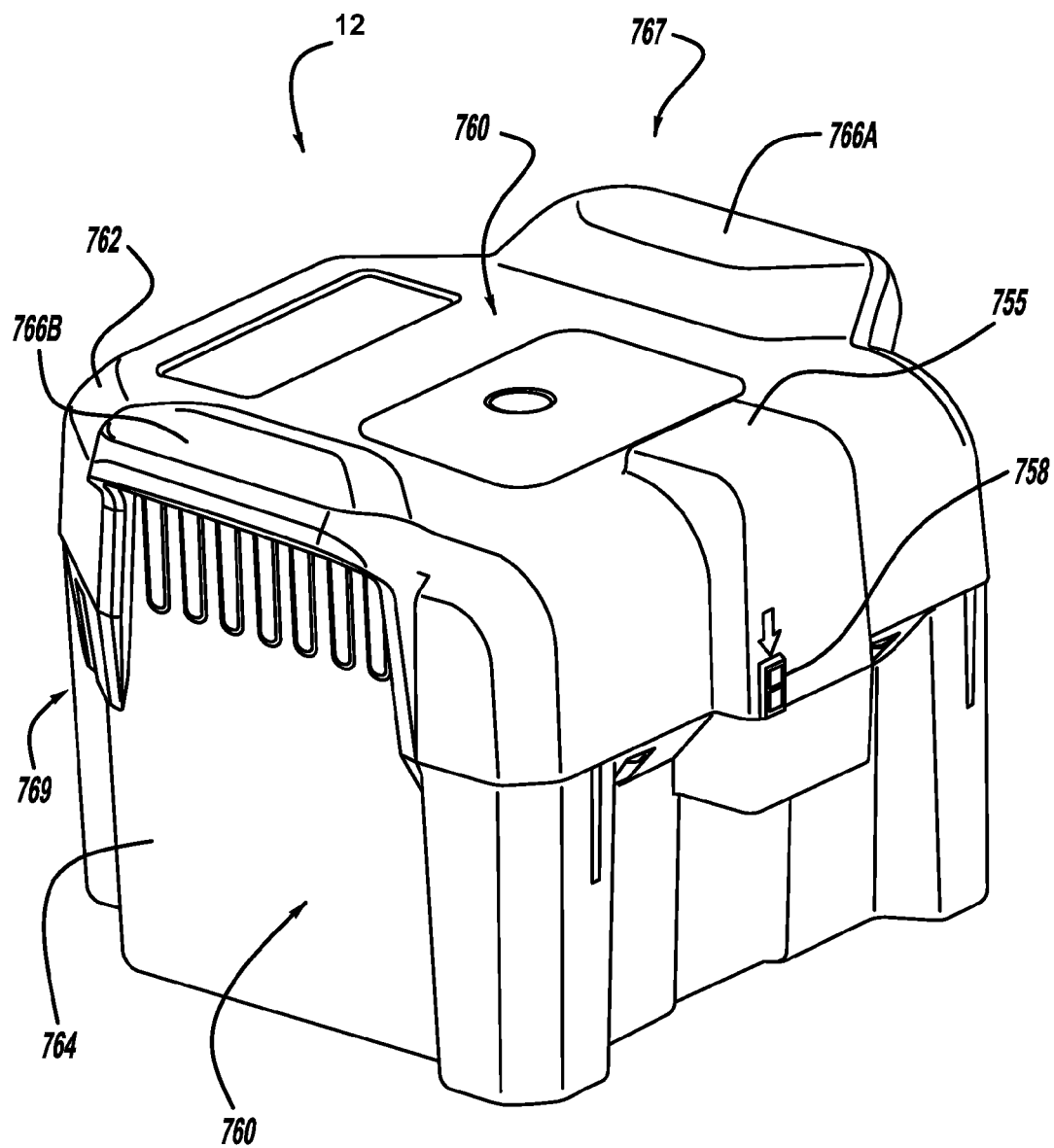
FIG. 8 is a perspective view of the battery of the exemplary battery-powered lawn mower shown in FIG. 2.

With reference to FIGS. 7, 8 and 10, the battery 12 is inserted within pocket 51 as follows. A user positions the battery 12 within pocket 51. For example only, the user may grasp first and second handles 766A-B in order to lift and position the battery 12 within pocket 51. The battery 12 is properly positioned and fully inserted within pocket 51 such that the first battery connector 756 engages and mates with mower connector 716. As described above, various features of the battery 12 and/or pocket 51 assist in the proper positioning and insertion of the battery 12 (projections 752A-D, 714A-C, 717, recess(es) 754A-C, 712A-D, 757, etc.).

Once the battery 12 is fully inserted within pocket 51 and the first battery connector 756 is engaged and mated with mower connector 716, the user engages the latch 722 with the battery 12, for example, latch catch 755. The user then rotates the lever 724 to lock the latch 722 and fully secure the battery 12 within the pocket 51.

The battery 12 is removed from being fully secured within pocket 51 as follows. A user rotates lever 724 to unlock the latch 722 from engagement with the battery 12. In some embodiments, the latch 722 automatically disengages from the battery 12 upon being unlocked. Alternatively, the user manually disengages the latch 722 from battery 12. A user then grasps the battery (such as, first and second handles 766A-B) in order to remove the battery 12 from pocket 51. In various embodiments, the mower connector 716 automatically disengages from first battery connector 756 as the battery 12 is removed from pocket 51.

Figure 17:
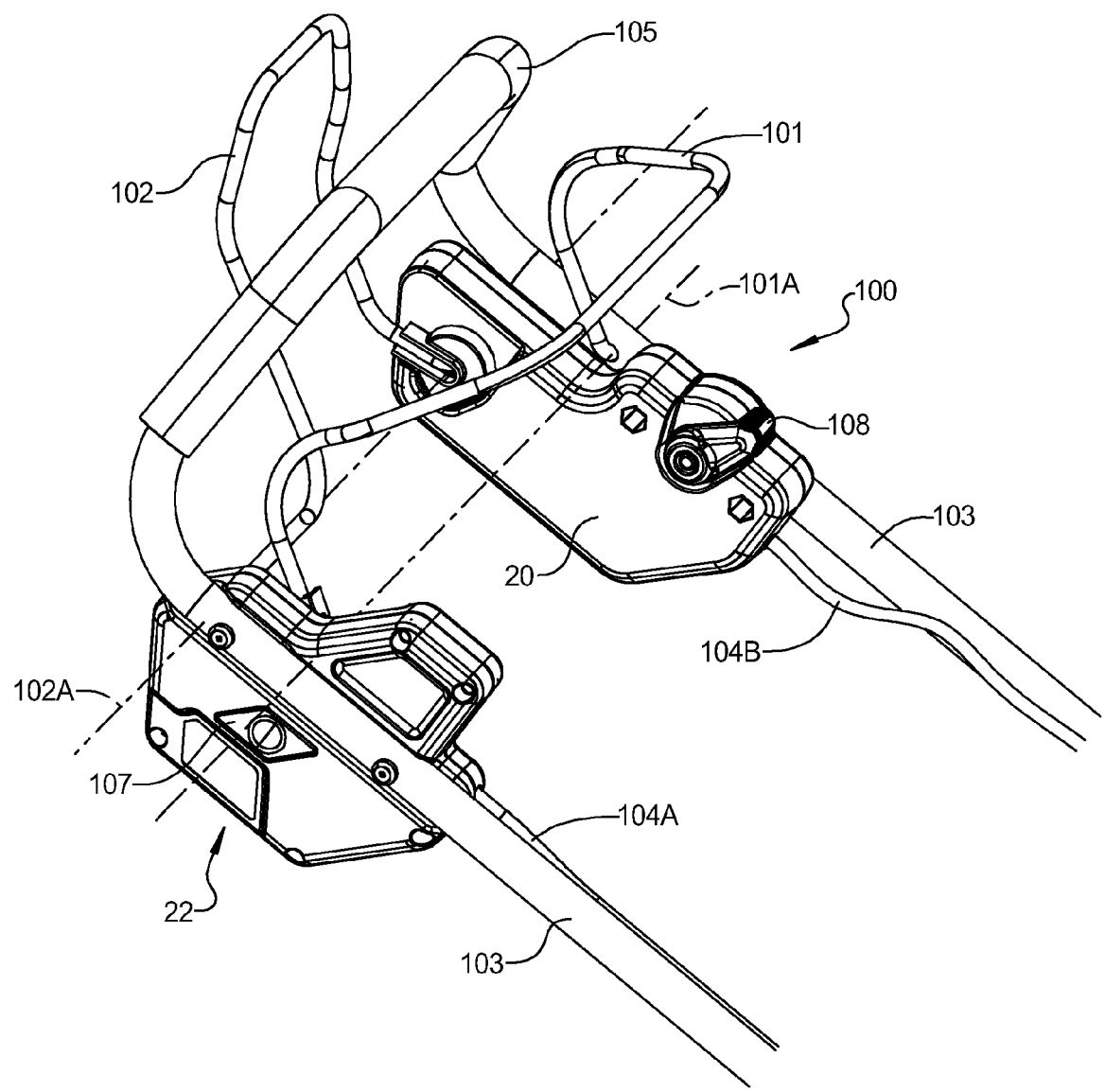
FIG. 17 is another partial perspective view of a control assembly of the exemplary battery-powered lawn mower shown in FIG. 2.

Another view of the user interface 22 is shown in FIG. 17. User interface 22 is secured to a handle assembly 100. The handle assembly 100 can include handle frames 103 that generally extend at an angle from the mower deck 50 to a handle grip 105. The handle assembly 100 can include a first or blade bail 101 and a second or drive bail 102. The blade bail 101 can cooperate with a control cable 104A to selectively provide power from battery 12 to blade motor 54 to drive blade 16. The drive bail 102 can cooperate with control cable 104B to communicate with the drive motor 56. In one example, the blade bail 101 can be rotated toward the handle grip 105 about an axis 101A. The drive bail 102 can be rotated toward the handle grip 105 about an axis 102A.

Blade bail 101 is actuated to switch the mower 10 between a cutting OFF mode and a cutting ON mode. In the cutting OFF mode, the blade bail 101 electrically disconnects the battery 12 from the blade motor 54 such that the blade 16 is not driven. In the cutting ON mode, the blade bail 101 electrically connects the battery 12 to the blade motor 54 such that the blade 16 may be driven. Similarly, drive bail 102 is actuated to switch the mower 10 between a self-drive OFF mode and a self-drive ON mode. In the self-drive OFF mode, the drive bail 102 electrically disconnects the battery 12 from the drive motor 56 such that the mower 10 is not propelled. In the self-drive ON mode, the drive bail 102 electrically connects the battery 12 to the drive motor 56 such that the mower 10 is propelled, e.g., by drive wheel(s) 30.

In order to inhibit unintended starting of the blade 16, user interface 22 can further include a safety lock-out mechanism 107, which prevents coupling the battery 12 with the blade motor 54. Therefore, in order to actuate the blade motor 54, a user depresses the lock-out mechanism 107 and pulls the blade bail 101 toward the handle grip 105 (that is, rotates the mower blade bail handle 101 counterclockwise in FIG. 17) to start the blade motor 54. In this manner, a user must complete two independent steps to actuate the blade bail 101 and start rotation of blade 16. An example lock-out mechanism 107 is disclosed in U.S. Pat. No. 7,762,049, which is herein incorporated by reference in its entirety.

To start the drive mechanism 18 a user urges the drive bail 102 toward the handle grip 105 (that is, rotates the drive bail 102 clockwise in FIG. 17). The drive speed of mower 10 can be adjusted by moving a speed control lever 108 on the user interface 22. The speed control lever 108 is coupled to the control circuit 20 which controls the power delivery from the battery 12 to the drive motor 56. Adjustment of the speed control lever 108 varies the voltage provided to drive motor 56 and thereby varies the speed of the mower 10. Alternatively, the drive speed of the mower 10 could be adjusted based on the position of the drive bail 102 such that, as the drive bail 102 is rotated clockwise, it progressively makes the drive mechanism 18 (and the lawn mower 10 as a whole) go faster. The voltage may be varied, for example, by changing the duty cycle of a pulse width modulated voltage signal or by adjusting the magnitude of the voltage delivered to the drive mechanism 18.

With reference to FIGS. 18-25, the bottom of deck 50 defines a cutting chamber 120 in which blade 16 is arranged. Cutting chamber 120 can have a toroidal shape. The deck 50, in combination with a discharge plate 121, defines discharge passage 122. Discharge passage 122 extends from the cutting chamber 120 to a discharge port 123. During operation of mower 10, the discharge passage 122 provides an outlet for grass and/or other waste to exit the cutting chamber 120, e.g., to be discharged or collected by a collection bag 80. A mulch door 124 can be coupled to the deck 50 and be arranged between the cutting chamber 120 and discharge passage 122. Mulch door 124 can be shaped to complement the toroidal shape of the cutting chamber 120. The mulch door 124 is movable between a discharge position (FIG. 19) and a mulch position (FIG. 18). In the discharge position, the mulch door 124 unblocks discharge passageway 122 to open the cutting chamber 120 to the discharge port 123. For example, mulch door 124 can be arranged to be tangent to the discharge passage 122 in the discharge configuration (as shown in FIG. 19 in which discharge plate 121 is not shown). In the mulch position, mulch door 124 blocks discharge passageway 122.

Figure 23:
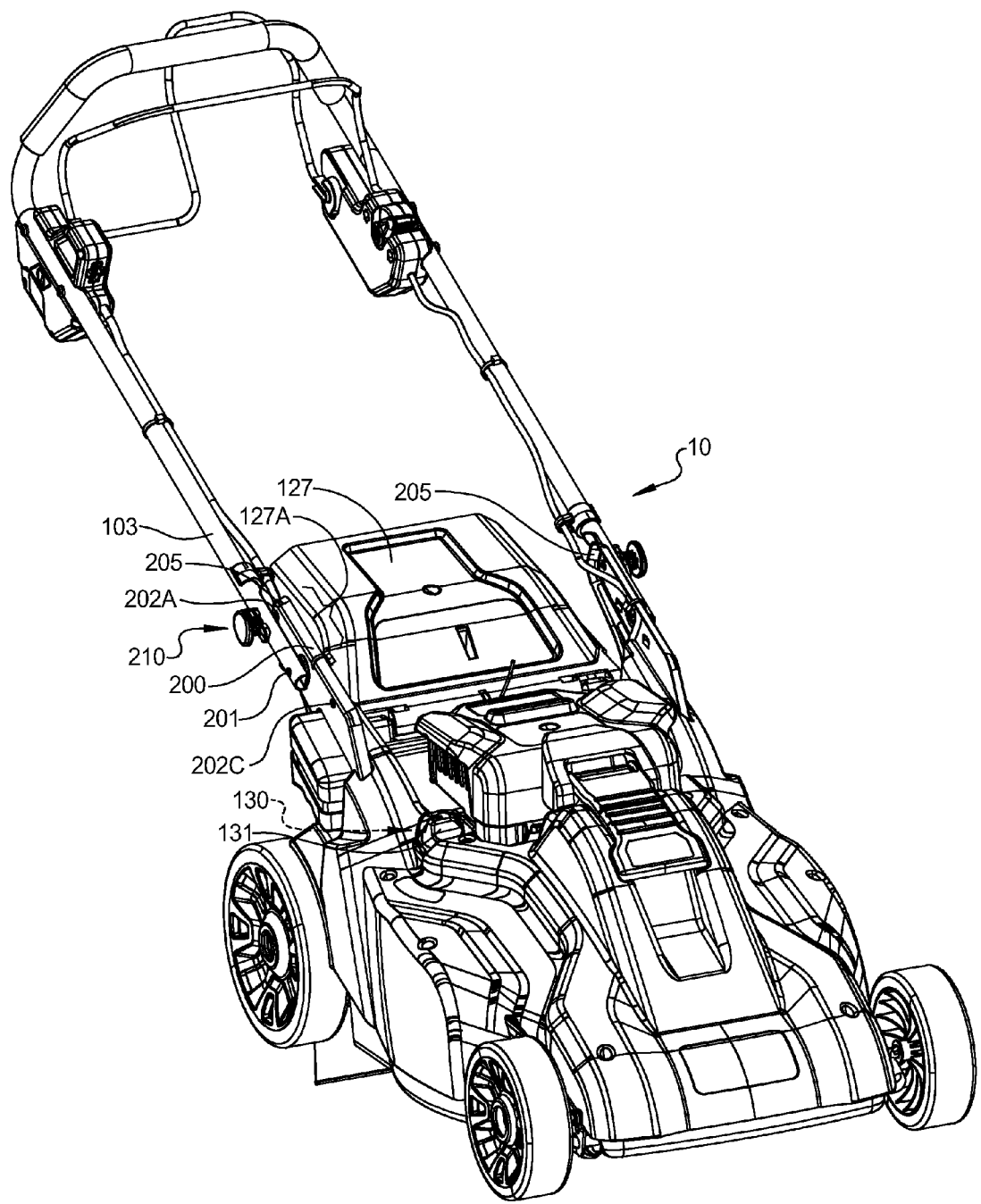
FIG. 23 is another partial perspective view of the exemplary battery-powered lawn mower shown in FIG. 2.
Figure 24:
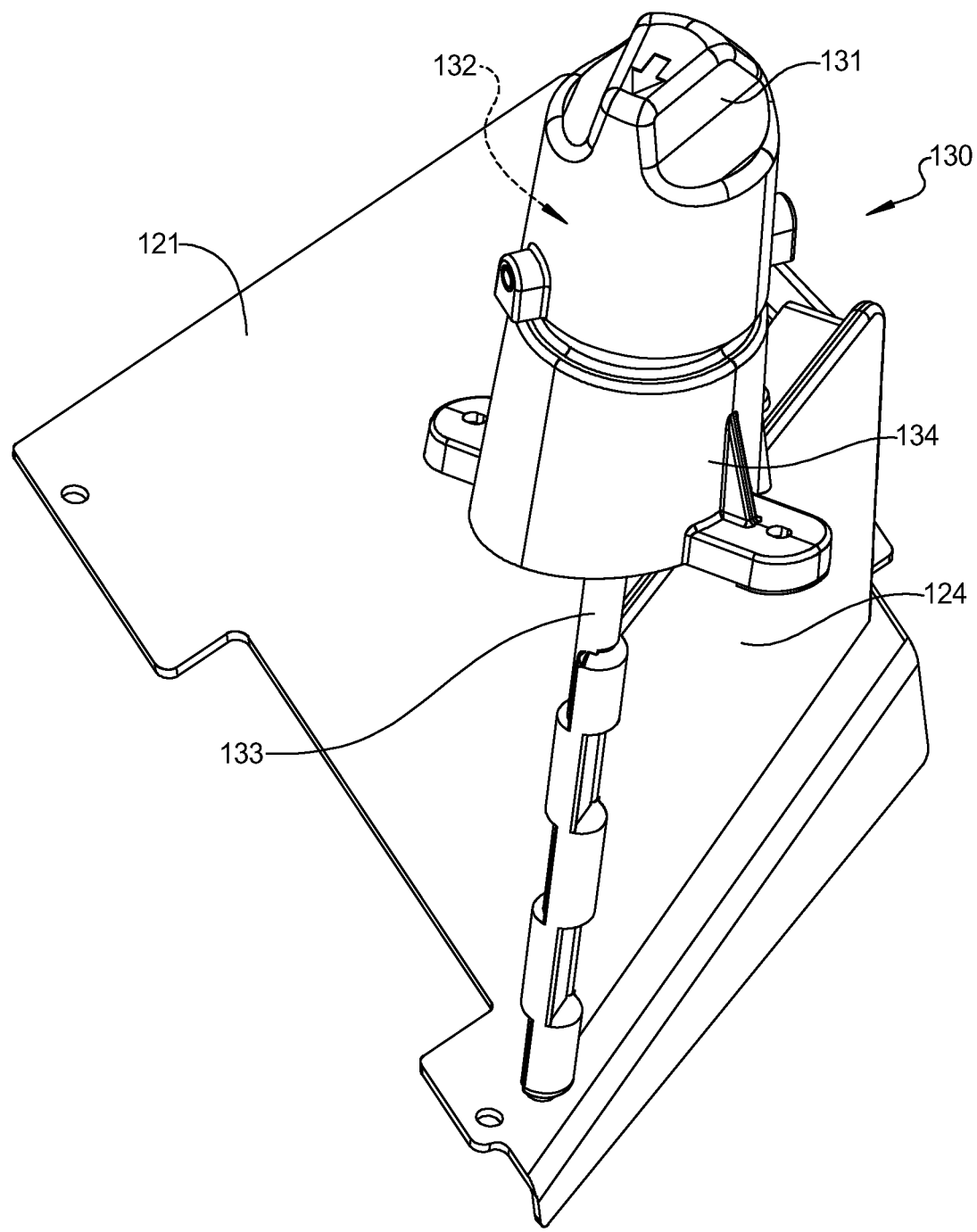
FIG. 24 is a partial perspective view of a mulch door rotation mechanism of the exemplary battery-powered lawn mower shown in FIG. 2.
Figure 25:
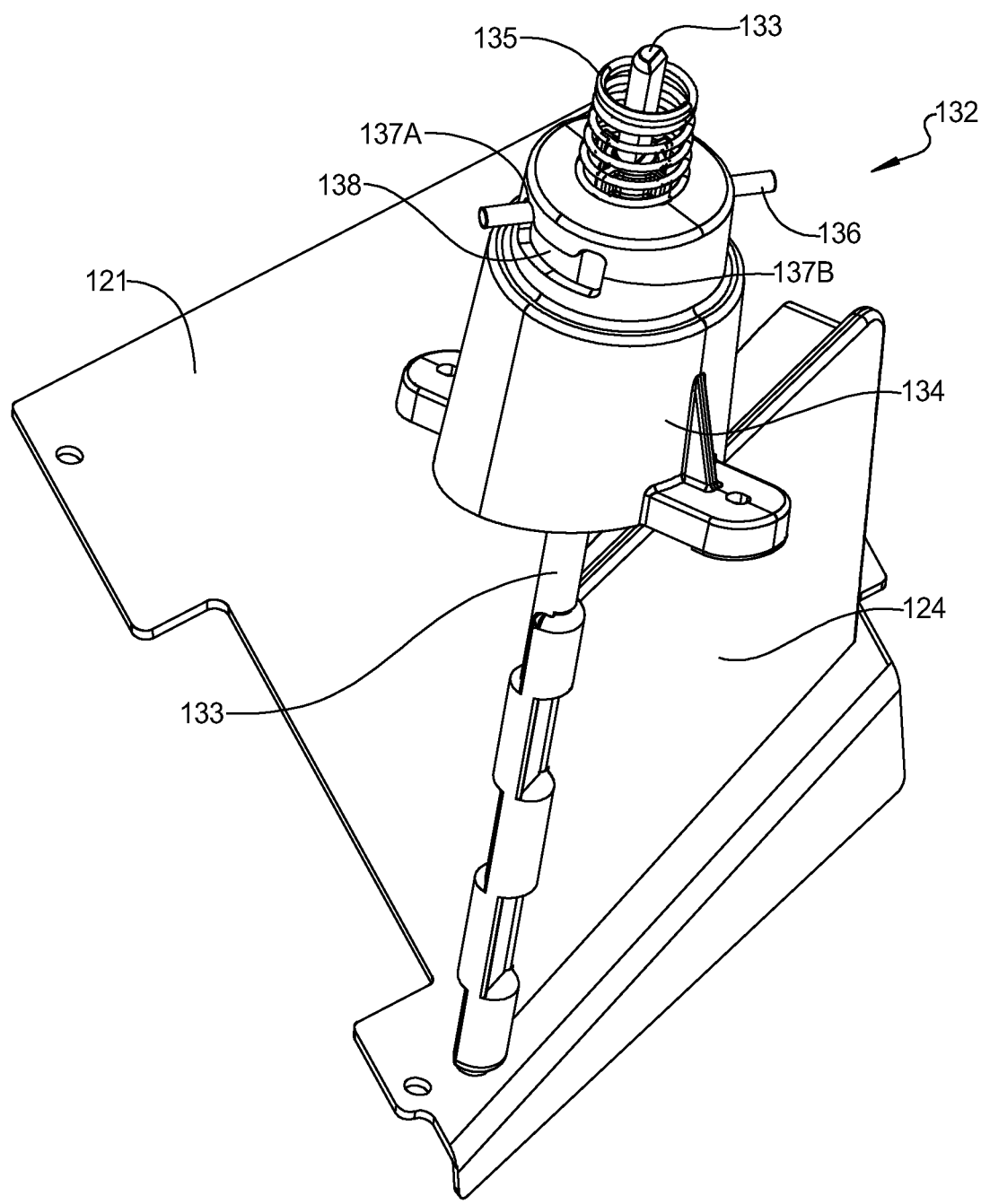
FIG. 25 is a partial perspective view of a mulch door rotation mechanism of the exemplary battery-powered lawn mower shown in FIG. 2.

The mulch door 124 can be rotated between the discharge and mulch positions. Referring to FIGS. 23-25, a mulch door rotation mechanism 130 can be coupled with the mulch door 124 to rotate the mulch door 124 between the discharge and mulch positions. The mulch door rotation mechanism 130 can include a knob 131 that is coupled to the mulch door 124 such that the mulch door 124 rotates with the knob 131. As shown in the example illustrated in FIGS. 24-25, the knob 131 is coupled to the mulch door 124 by a vertical shaft 133 that extends through a spacer 134. The spacer 134 is coupled to the deck 50 and is configured to support the knob 131 in the proper position in relation to deck 50.

Figure 22:
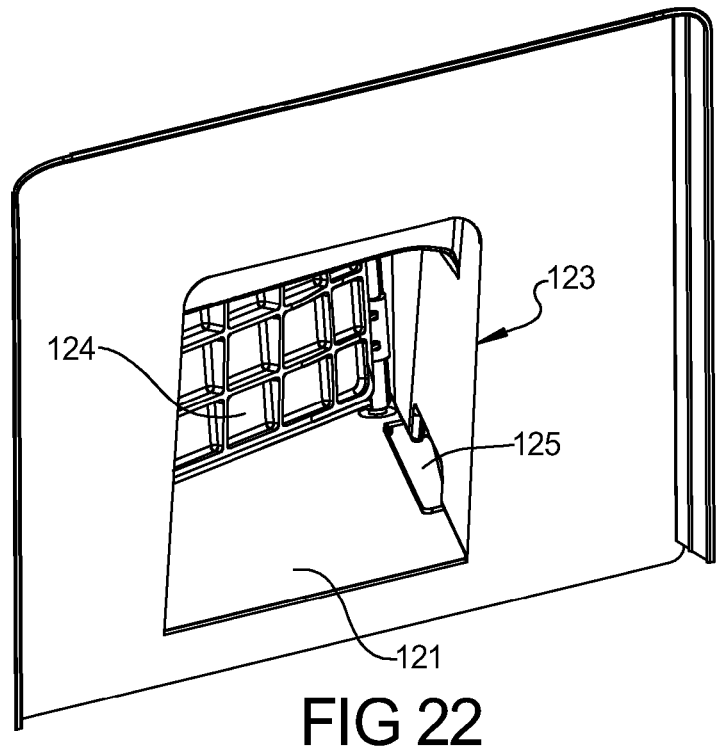
FIG. 22 is another partial perspective rear view of the exemplary battery-powered lawn mower shown in FIG. 2 showing a mulch door.

Discharge plate 121 and deck 50 cooperate to define a grass outlet aperture 125 in discharge passage 122 (FIG. 22). The grass outlet aperture 125 provides an outlet for grass clippings and other waste to exit discharge passage 122. For example, during rotation of mulch door 124 from the mulch position (FIG. 20) to the discharge position (FIG. 19) the mulch door 124 will sweep any grass clippings/waste from the discharge passage 122/discharge plate 121 out of the grass outlet aperture 125.

The mulch door rotation mechanism 130 can further include a locking mechanism 132 that secures the knob 131 and mulch door 124 in specific positions, such as the discharge configuration and the mulch configuration. In the illustrated example, the locking mechanism 132 includes a compression spring 135, a pin 136 and one or more detents defined by the spacer 134, such as first and second detents 137A, 137B. The pin 136 is fixedly coupled to and rotatable with knob 131 and is arranged within an aperture 138 defined by spacer 134. The pin 136 is movable within aperture 138 and interacts with first and second detents 137A, 137B to provide locking positions for the mulch door 124. Compression spring 135 is arranged between spacer 134 and knob 131 and acts to bias the knob 131 to be in the positions defined by detents 137A, 137B. In order to rotate the mulch door 124, a user pushes on knob 131 to compress the compression spring 135 and release the pin 136 from one of the detent positions. The knob 131 can then be freely rotated to another position.

As described above, with the mulch door 124 in the discharge position grass clippings and other waste will travel through the discharge passage 122 and out of the discharge port 123 during operation of mower 10. This waste can either be collected in collection bag 80 or be discharged.

Figure 21:
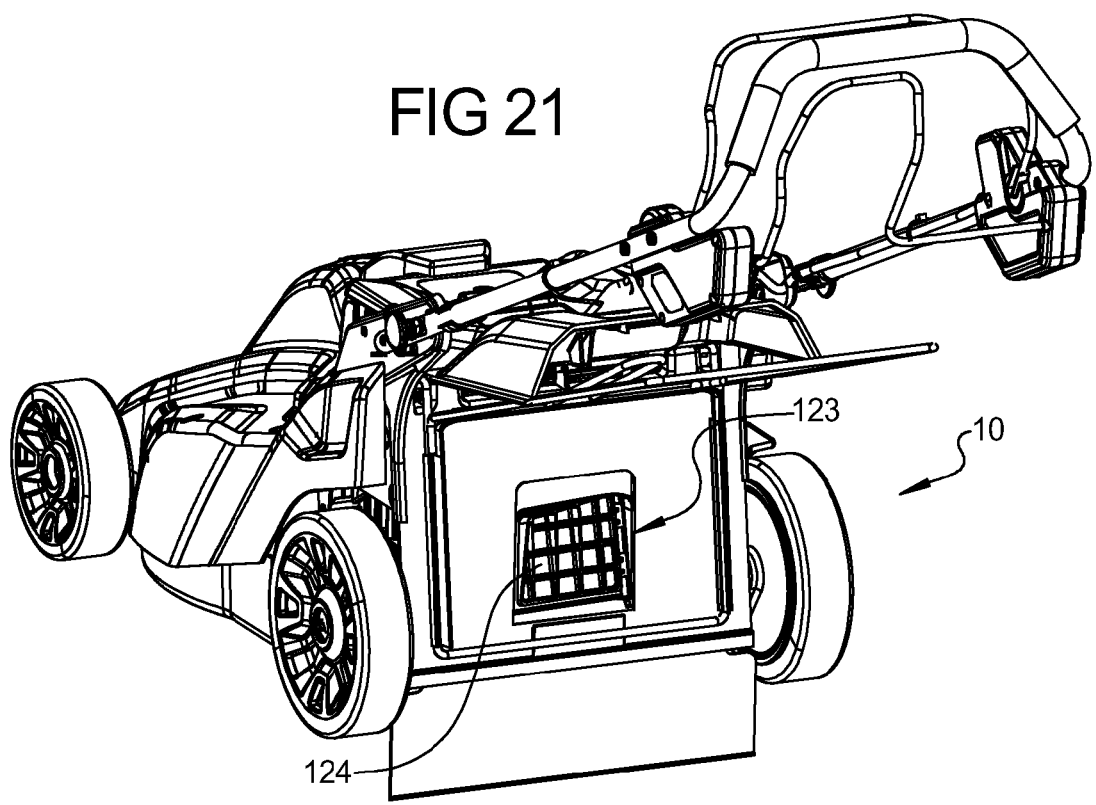
FIG. 21 is a partial perspective rear view of the exemplary battery-powered lawn mower shown in FIG. 2 showing a mulch door.
Figure 26:
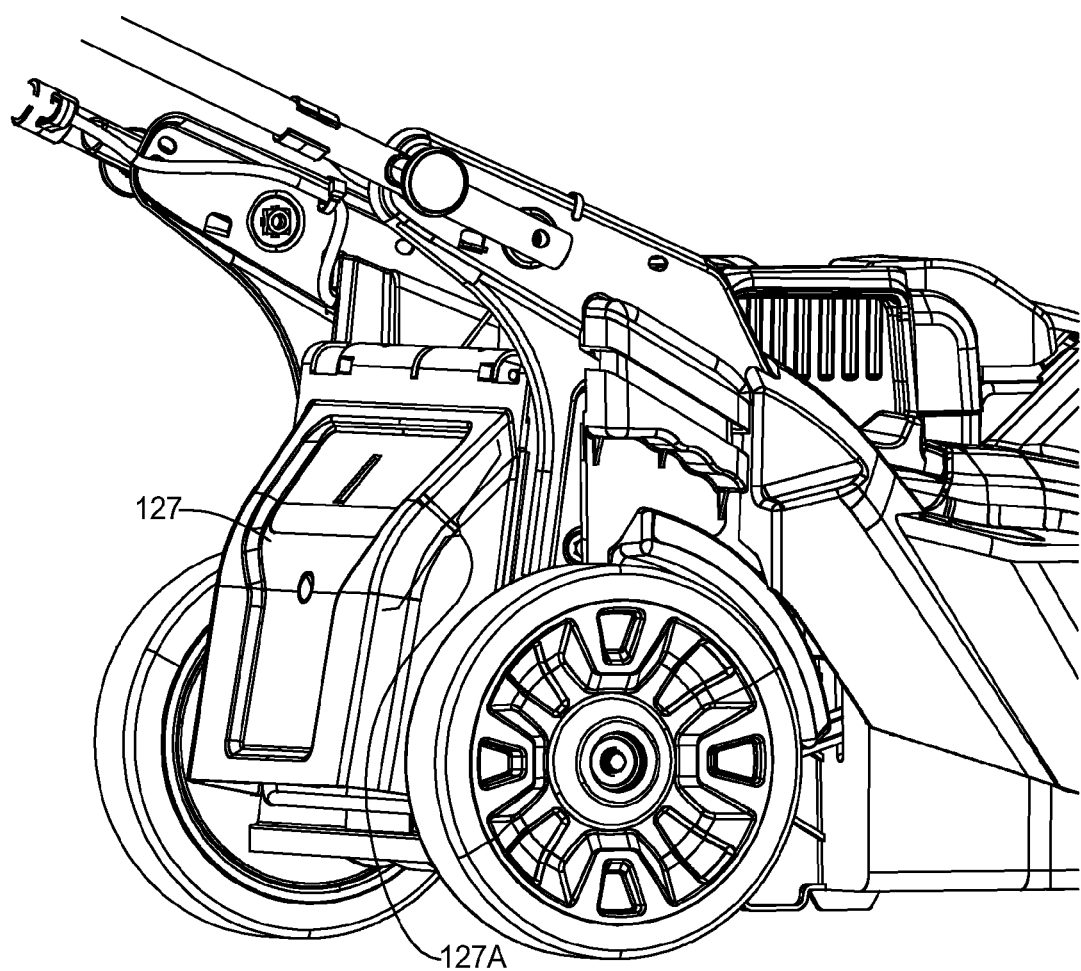
FIG. 26 is another partial perspective rear view of the exemplary battery-powered lawn mower shown in FIG. 2.
Figure 27:
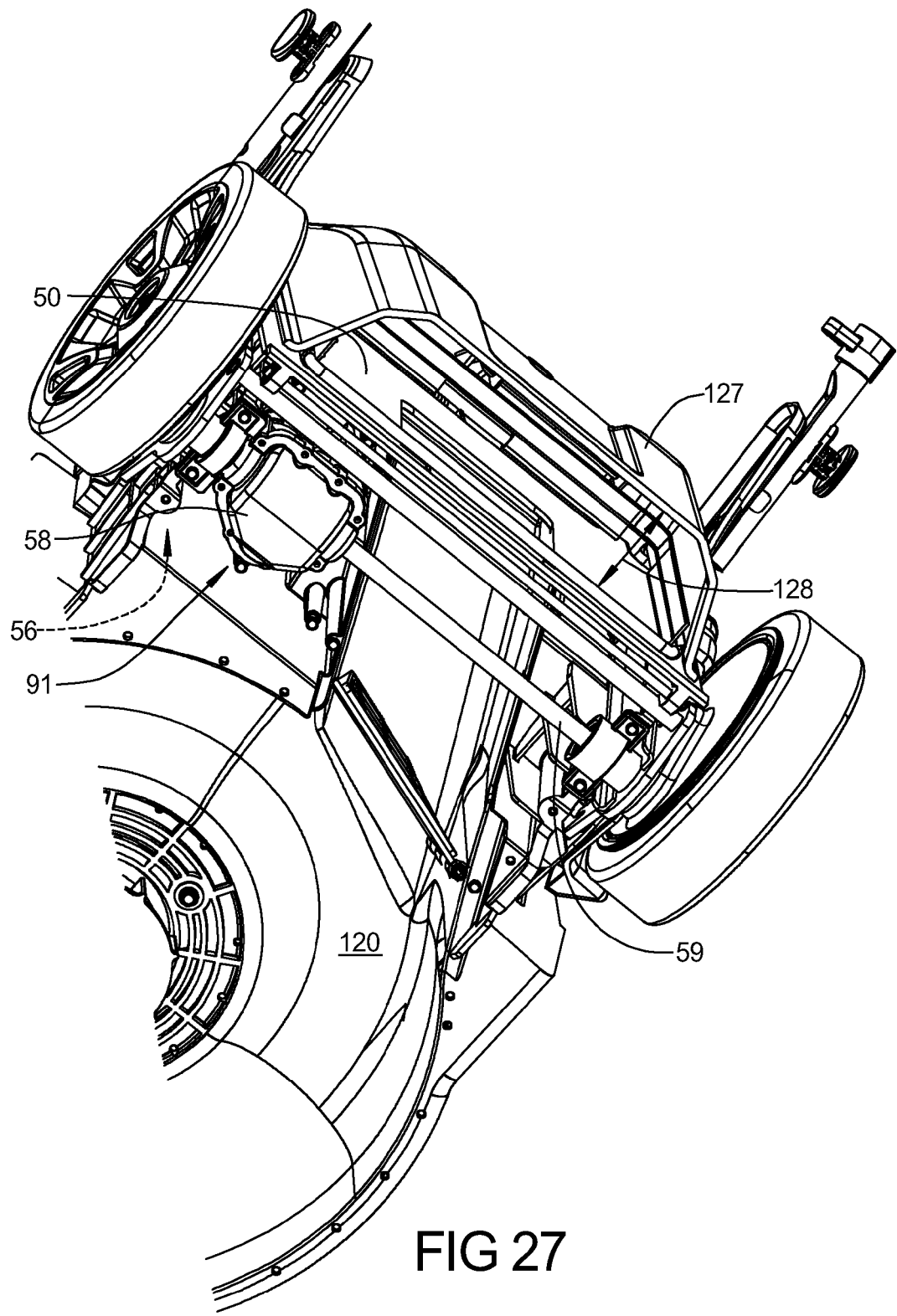
FIG. 27 is another partial perspective rear view of the exemplary battery-powered lawn mower shown in FIG. 2.

In order to permit rear discharge of grass clippings/waste while preventing the clippings from striking a user of mower 10, a discharge door 127 can be coupled to deck 50. FIG. 26 shows a discharge door 127 attached to the rear of the mower 10 to deflect grass clippings/waste from the discharge passage 122 downwardly. Discharge door 127 can be U-shaped or otherwise constructed such that discharge door 127 defines a discharge cavity 128 to provide the space necessary for the passage of the clippings. The discharge door 128 can include an angled portion 127A that directs the flow of grass clippings/waste out of the bottom of the discharge cavity 128. In order to collect grass clippings/waste, collection bag 80 can be coupled to deck 50 as is known in the art, for example, by lifting discharge door 127, as illustrated in FIGS. 21 and 23.

Mower 10 includes a blade motor 54 for driving blade 16 and a drive motor 56 for imposing motion onto drive wheel(s) 30 in order to propel the mower 10. The blade and drive motors 54, 56 can be operated independently. That is, the blade 16 can be powered by the blade motor 54 without the drive motor 56 propelling the mower 10 and the drive motor 56 can be powered to propel the mower 10 without the blade motor 54 driving the blade 16.

Figure 20:
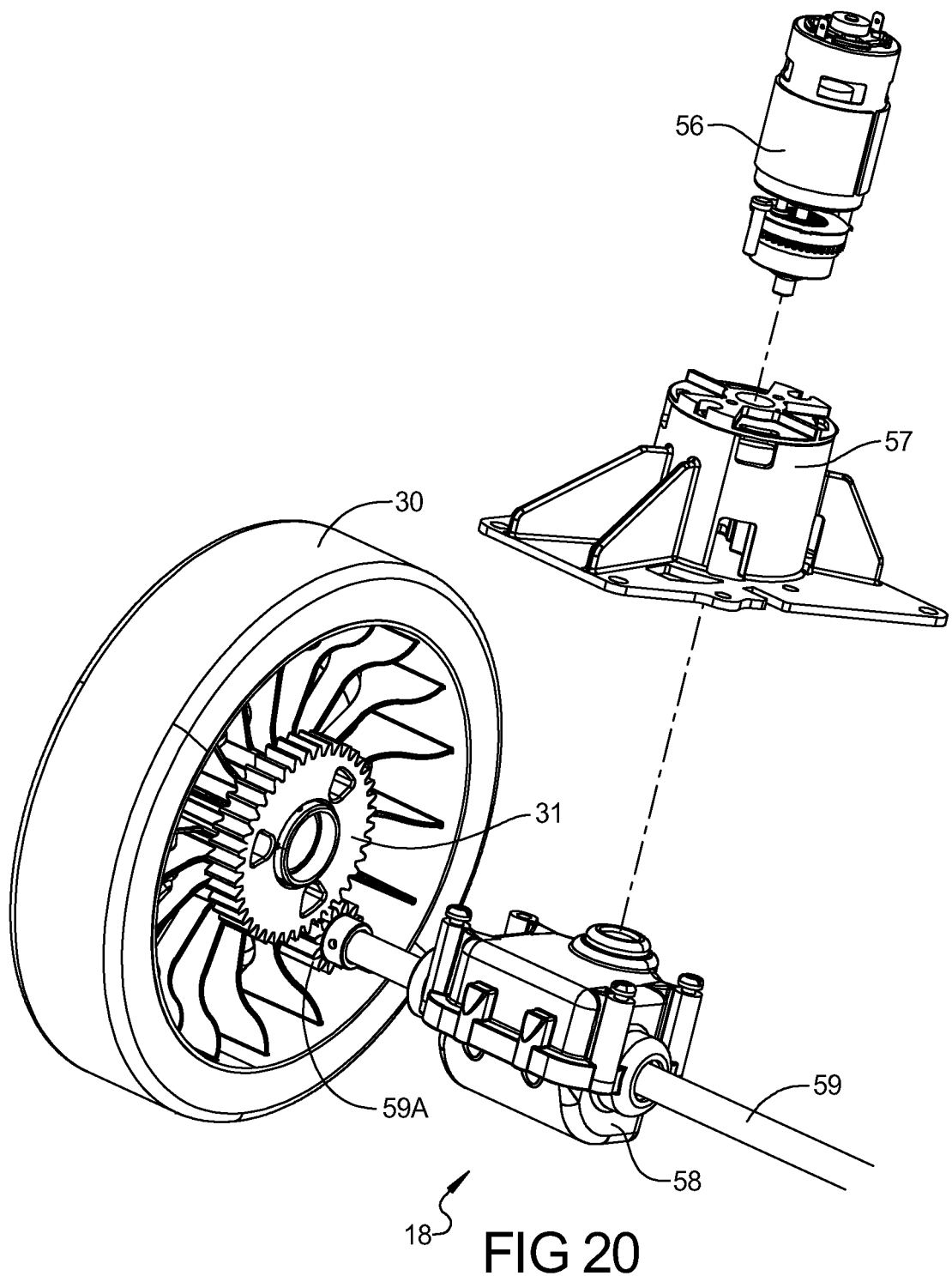
FIG. 20 is a partial perspective view of a drive mechanism of the exemplary battery-powered lawn mower shown in FIG. 2.

Drive motor 56 may be coupled to driving wheel(s) 30 through at least one gear mechanism. However, the present exemplary gear mechanism shown in FIG. 20 is a multi-stage gear reduction having a planetary gear assembly 57, a self-drive transmission 58, a drive axle gear 59A. and a wheel gear 31. The planetary gear assembly 57 and a self-drive transmission 58 translates a rotational output of the drive motor 56 into a rotational output of a drive axle 59 coupled to drive wheel(s) 30. The self-drive transmission 58 is a worm gear that engages the drive motor 56 (through planetary gear assembly 57) to the drive wheel(s) 30 during self-drive operation, while permitting free-wheeling operation when the drive motor 56 is not powered. The drive axle 59 is coupled to the drive wheel(s) 30 through a drive axle gear 59A that interacts with a wheel gear 31.

The gear mechanism provides a gear reduction from the drive motor 56 to the drive wheels 30 to translate the revolutions per minute ("rpm") of the drive motor 56 to the drive speed of the motor (the rpm of the drive wheels 30). The drive motor 56 can operate between 6,000 and 17,000 revolutions per minute and the gear mechanism can have a gear reduction between 90:1 and 130:1, for example. The planetary gear assembly 57 provides a first gear reduction (a planetary gear reduction) from drive motor 56, while self-drive transmission 58 provides a second gear reduction (a worm gear reduction). Additionally, the gear ratio of the drive axle gear 59A and wheel gear 31 can provide a third reduction. For example only, the first gear reduction can be 3.67:1, the second gear reduction can be 9:1 and the third gear reduction can be 3.25:1 to provide a total gear reduction from drive motor 56 to wheel(s) of 107.3:1. In this example, if the drive motor 56 operates at 10,000 revolutions per minute and the drive wheel(s) 30 diameter is 9 inches, the maximum drive speed of mower 10 will be approximately 2.5 miles per hour.

Figure 29:
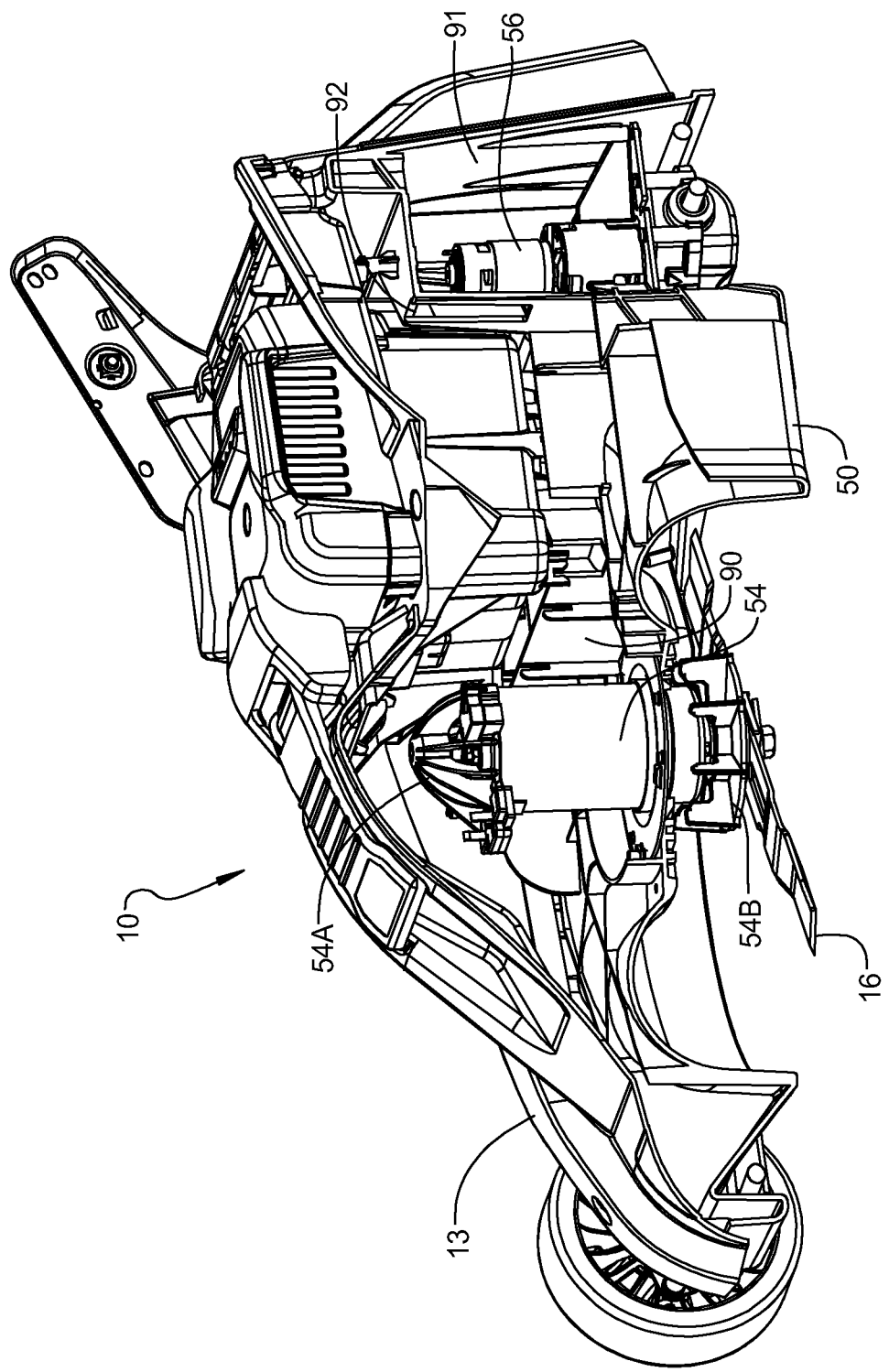
FIG. 29 is a partial sectional view taken through the deck of the exemplary battery-powered lawn mower shown in FIG. 2.

During operation of mower 10, the blade and drive motors 54, 56 generate heat and may need to be cooled. For example, as shown in FIGS. 28 and 29, blade motor 54 is coupled to deck 50 with a first end 54A arranged within a chamber 90 defined by deck 50 and a second end 54B coupled to the blade 16 in the cutting chamber 120. Blade motor 54 is configured to be cooled by a flow of air entering the first end 54A from the cooling chamber 90 and exiting from the second end 54B into the cutting chamber 120. Air can enter chamber 90, e.g., through one or more windows 92 defined by deck 50 to provide a vent to external air, as described more fully below. In this manner, the blade motor 54 is configured to convey air from the chamber 90 to the cutting chamber 120 in order to cool the blade motor 54.

Drive motor 56 is arranged adjacent the rear wheels in a second chamber 91 defined by the deck 50. Due to its location behind the battery, the limited space of this second chamber 91 makes cooling the drive motor 56 difficult. Therefore, the second chamber 91 includes one or more windows 92 that allow air in the second chamber 91 to escape into an air passageway connected to the first chamber 90. The air passageway is defined by the deck 50 and shroud 13 (not shown in FIG. 28) and is located to the side of the battery in FIG. 28.

Air in the first chamber 90 is then vented to the external environment through blade motor 54. Additionally, operation of the blade motor 54 will create negative pressure in the first chamber 90 relative to the second chamber 91 and generate an air flow from the second chamber 91 to help cool the drive motor 56.

In some embodiments, control circuit 20 can be configured to protect the mower 10 from an electrical overload condition, such as a short circuit. Upon detection of an overload condition, the control circuit 20 will electrically disconnect the battery 12 from the drive motor 56. An overload condition can include the situation in which current provided to the drive motor 56 exceeds a threshold. Alternatively or in addition to current exceeding a threshold, an overload condition can include current exceeding a threshold for a predetermined period. In some embodiments, an overload condition can include current exceeding a second threshold for a second predetermined period, in which the second threshold is greater than the first threshold and the second predetermined period is shorter than the first predetermined period. For example only, an overload condition can be defined as a condition in which current delivered to the drive motor 56 is greater than 10 amperes but less than 15 amperes for a period of 5 or more seconds, or greater than 15 amperes for a period of 1 or more seconds. While the above description is limited to describing an overload condition for the drive motor 56, it will be appreciated that an overload condition for blade motor 54 is also within the scope of the present disclosure.

In addition to overload protection, control circuit 20 can be configured to provide a soft-start to drive motor 56 in order to reduce or eliminate abrupt movement (or "jump") of the mower 10 at the beginning of self-drive operation. In some embodiments, upon actuation of the drive bail 102 the control circuit 20 will gradually increase the voltage provided to drive motor 56 until reaching the desired operating voltage, e.g., the operating voltage determined by the position of speed control lever 108. For example only, control circuit 20 will increase the voltage provided to drive motor 56 over a predetermined period, such as 1-3 seconds.

In some embodiments, the handle assembly 100 is capable of being rotated in relation to the deck 50 in order to "fold" the handle assembly 100 over the deck 50 to reduce the size of mower 10 for storage. For example and with reference to FIGS. 23, 30 and 31, two handle plates 200 fixedly coupled to deck 50 can be utilized to couple the handle assembly 100 with the deck 50. Handle frames 103 can be rotatably coupled to handle plates 200 by fasteners 201, such as a nut and bolt. A knob assembly 210 that is offset from the fasteners 201 can interact with one or more openings 202A-C defined by handle plates 200 to inhibit rotation of the handle assembly 100. Openings 202A and 202B are utilized to lock the handle assembly 100 in the proper position for operation of mower 10. Openings 202A and 202B each correspond to a different position of handle assembly 100, which can be selected based on user preference. Opening 202C corresponds to a storage position in which handle assembly 100 is folded over deck 50. The storage position (FIG. 31) of handle assembly 100 permits mower 10 to be stored vertically, e.g., with a contact portion 205 of handle plates 200 in resting on a storage surface.

Figure 30:
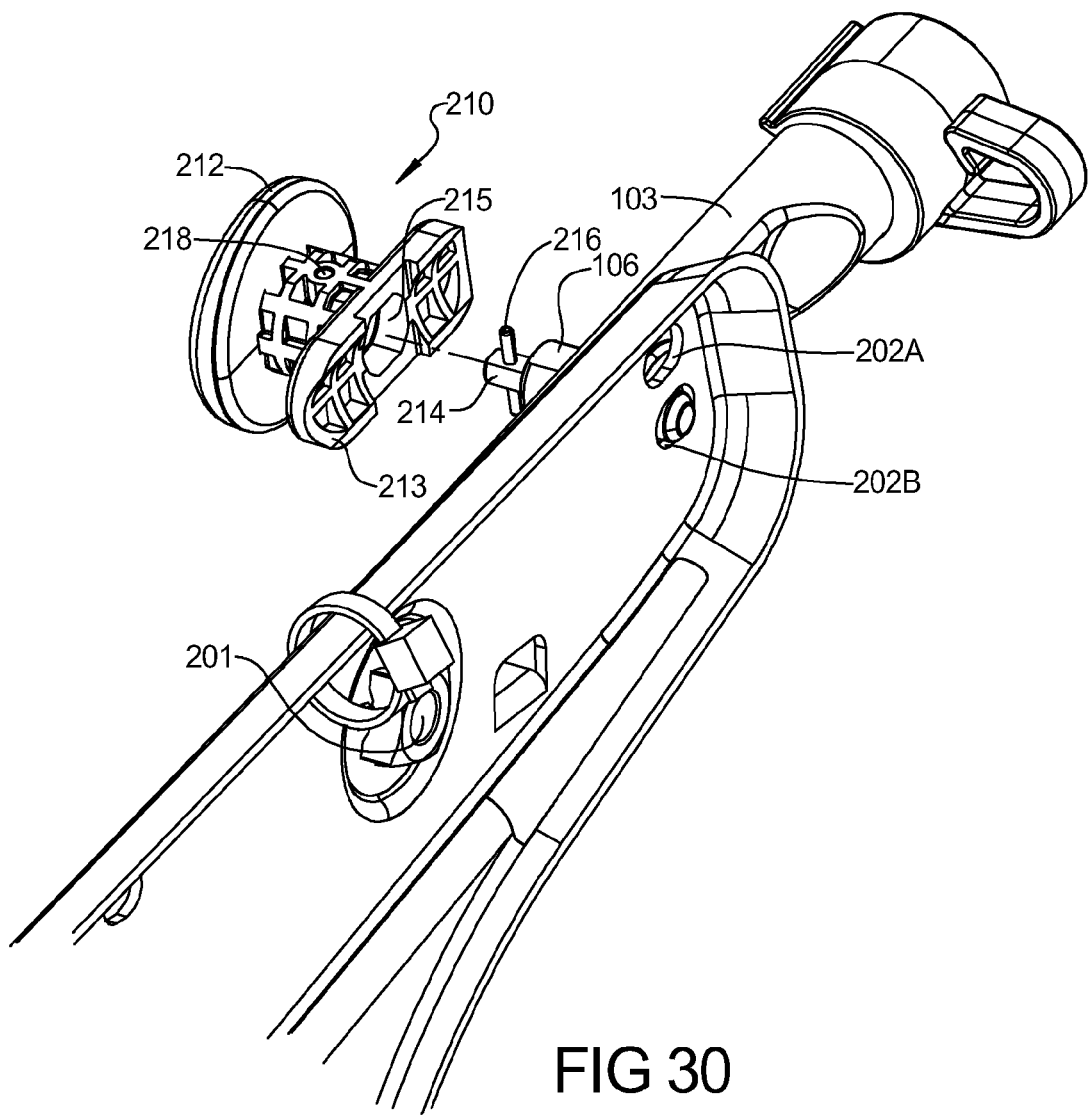
FIG. 30 is a partial perspective view of a knob assembly of the exemplary battery-powered lawn mower shown in FIG. 2.
Figure 31:
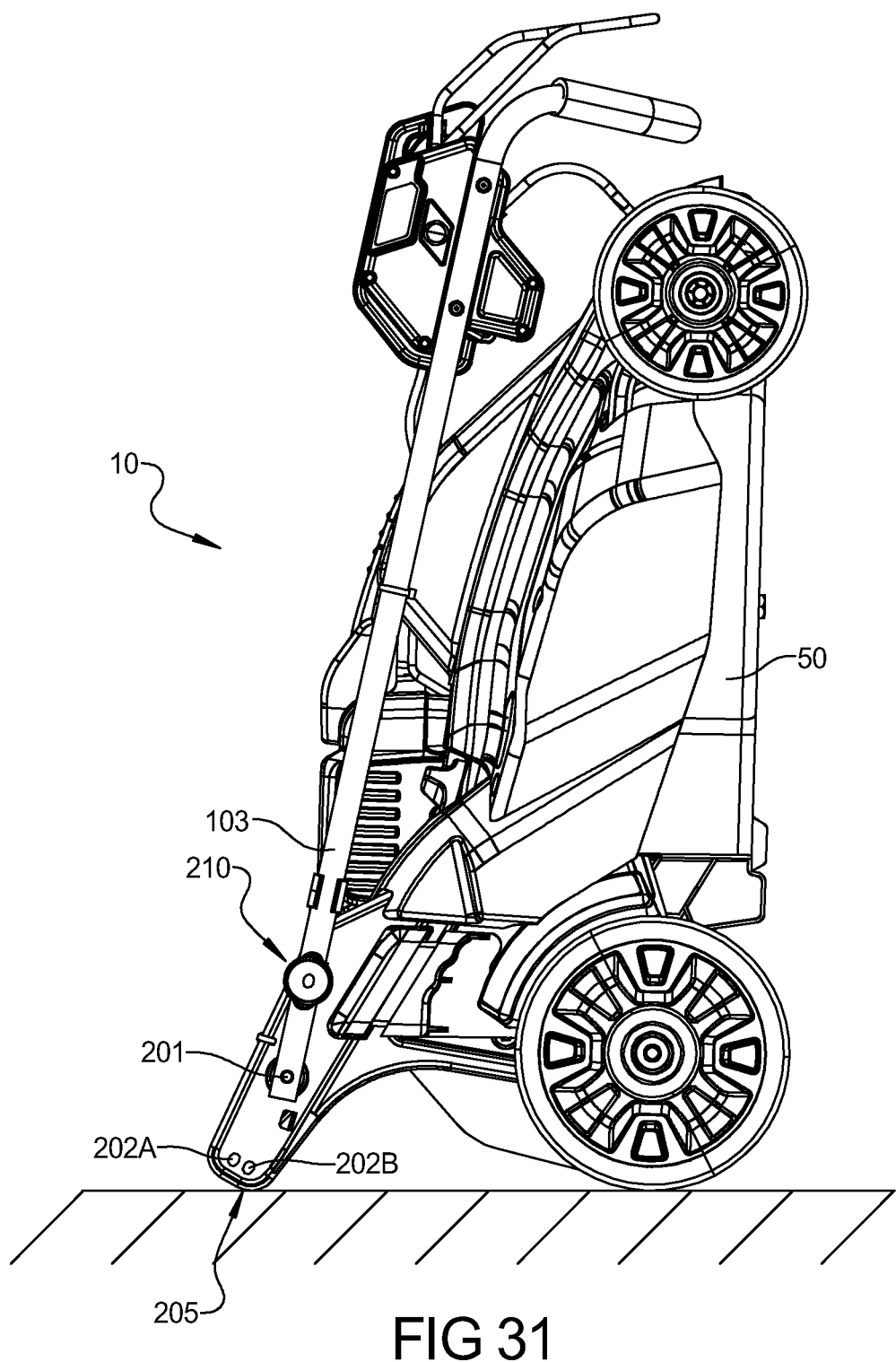
FIG. 31 is a side view of the exemplary battery-powered lawn mower shown in FIG. 2 in a storage configuration.

With specific reference to FIG. 30, an exemplary knob assembly 210 includes a graspable knob 212 that is coupled with an extension peg 214 by a pin 216 inserted into an opening 218 defined by graspable knob 212. Extension peg 214 can be biased to an extended or locked position, e.g., by a spring, in which knob contact surface 213 contacts handle frame 103 and extension peg 214 is extended, e.g., into openings 202A-C. In order to release extension peg 214 from opening 202A, 202B or 202C, a user pulls on graspable knob 212. Furthermore, rotation of graspable knob 212 can move the knob assembly 210 to a released position in which extension peg 214 is retracted such that extension peg 214 does not interact with opening(s) 202A-C and the handle assembly can be freely rotated. For example only, graspable knob 212 can define an aperture 215 that interacts with a projection 106 formed on handle frames 103. The shape of aperture 215 can complement the shape of projection 106 to inhibit rotation of the graspable knob 212 in the locked position and to secure the knob assembly in the released position when the graspable knob 212 is rotated.

While the disclosure has been described in the specification and illustrated in the drawings with reference to various embodiments, it will be understood by those skilled in the art that various changes may be made and equivalents may be substituted for elements thereof without departing from the scope of the disclosure as defined in the claims. Furthermore, the mixing and matching of features, elements and/or functions between various embodiments is expressly contemplated herein so that one of ordinary skill in the art would appreciate from this disclosure that features, elements and/or functions of one embodiment may be incorporated into another embodiment as appropriate, unless described otherwise above. Moreover, many modifications may be made to adapt a particular situation or material to the teachings of the disclosure without departing from the essential scope thereof. Therefore, it is intended that the disclosure not be limited to the particular embodiments illustrated by the drawings and described in the specification as the best mode presently contemplated for carrying out this disclosure, but that the disclosure will include any embodiments falling within the foregoing description and the appended claims.

What is claimed is:

1. A cordless mower comprising:
    a deck supported by front and rear wheels, the deck having a top side, a bottom side, a front end and a rear end;
    a rechargeable battery supported on said deck;
    a blade for cutting grass on the bottom side of the deck;
    a blade motor coupled to the blade; and
    a drive motor connected to the rear wheels for driving said rear wheels, the drive motor located in a chamber at the rear of the mower adjacent the rear wheels, the chamber having an opening therein to allow air to flow through, wherein an air pathway connects the drive motor with the blade motor through the opening in the chamber.

2. The cordless mower of claim 1, wherein the blade motor is positioned generally centrally on the deck.

3. The cordless mower of claim 1, wherein when the blade motor is actuated it creates a negative air pressure zone to draw air through the air pathway from the chamber.

4. The cordless mower of claim 1, wherein the battery is positioned on the top side of the mower behind the blade motor and in front of the drive motor.

5. The cordless mower of claim 4, wherein the top side of the deck is covered by a shroud having a pocket, and the battery is removably secured within said pocket.

6. A cordless mower comprising:
    a deck supported by front and rear wheels, the deck having a top side, a bottom side, a front end and a rear end, the bottom side defining a cutting chamber and the deck defining a first chamber;
    a rechargeable battery supported on said deck;
    a blade for cutting grass on the bottom side of the deck and arranged within the cutting chamber;
    a blade motor coupled to the blade, the blade motor including a first end arranged within the first chamber and a second end arranged within the cutting chamber; and
    a drive motor connected to the rear wheels for driving said rear wheels, the drive motor located in a second chamber at the rear of the mower adjacent the rear wheels, the second chamber having an opening therein to allow air to flow through, wherein an air pathway connects the drive motor with the blade motor through the opening in the second chamber.

7. The cordless mower of claim 6, wherein the blade motor is positioned generally centrally on the deck.

8. The cordless mower of claim 6, wherein when the blade motor is actuated it creates a negative air pressure zone to draw air through the air pathway from the second chamber.

9. The cordless mower of claim 6, wherein the battery is positioned on the top side of the mower behind the blade motor and in front of the drive motor.

10. The cordless mower of claim 9, wherein the top side of the deck is covered by a shroud having a pocket, and the battery is removably secured within said pocket.

11. The cordless mower of claim 6, further comprising a shroud that cooperates with the deck to define the first chamber.

12. A cordless mower comprising:
    a deck supported by front and rear wheels, the deck having a top side, a bottom side, a front end and a rear end, the bottom side defining a cutting chamber, the deck defining a first chamber and a second chamber;
    a shroud covering the top side of the deck and cooperating with the deck to define the first chamber;
    a rechargeable battery supported on said deck;
    a blade for cutting grass on the bottom side of the deck and arranged within the cutting chamber;
    a blade motor coupled to the blade, the blade motor including a first end arranged within the first chamber and a second end arranged within the cutting chamber; and
    a drive motor connected to the rear wheels for driving said rear wheels, the drive motor located in the second chamber at the rear of the mower adjacent the rear wheels, the second chamber having an opening therein to allow air to flow through, wherein an air pathway connects the drive motor with the blade motor through the opening in the second chamber,
    wherein in operation the blade motor is actuated to rotate the blade in order to create a negative air pressure zone to draw air from outside the deck into the second chamber, air from the second chamber through the opening and into the first chamber, and air from the first chamber through the first end of the blade motor and out the second end of the blade motor into the cutting chamber.

13. The cordless mower of claim 12, wherein the blade motor is positioned generally centrally on the deck.

14. The cordless mower of claim 12, wherein when the blade motor is actuated it creates the negative air pressure zone to draw air through the air pathway from the second chamber.

15. The cordless mower of claim 12, wherein the battery is positioned on the top side of the mower behind the blade motor and in front of the drive motor.

16. The cordless mower of claim 15, wherein the shroud defines a pocket, and the battery is removably secured within said pocket.

17. The cordless mower of claim 12, wherein when the blade motor is actuated it creates the negative air pressure zone to draw air through the air pathway from the second chamber.

* * * * *